(12) United States Patent
Nodelman et al.

(10) Patent No.: US 7,689,521 B2
(45) Date of Patent: *Mar. 30, 2010

(54) CONTINUOUS TIME BAYESIAN NETWORK MODELS FOR PREDICTING USERS' PRESENCE, ACTIVITIES, AND COMPONENT USAGE

(75) Inventors: Uri D. Nodelman, Oakland, CA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1541 days.

This patent is subject to a terminal disclaimer.

(21) Appl. No.: 10/882,068

(22) Filed: Jun. 30, 2004

(65) Prior Publication Data

US 2005/0021485 A1     Jan. 27, 2005

Related U.S. Application Data

(63) Continuation-in-part of application No. 10/609,972, filed on Jun. 30, 2003, now Pat. No. 7,233,933, and a continuation-in-part of application No. 09/894,087, filed on Jun. 28, 2001, now Pat. No. 7,409,423.

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |

(52) U.S. Cl. ........................................................ 706/21
(58) Field of Classification Search ................. 706/21
See application file for complete search history.

(56) References Cited

U.S. PATENT DOCUMENTS 5,493,692 A     2/1996    Theimer et al.

(Continued)

FOREIGN PATENT DOCUMENTS

WO            9800787          1/1998

OTHER PUBLICATIONS

Uri Nodelman, et al., Learning Continuous Time Bayesian Networks, Proceedings of the Nineteenth International Conference on Uncertainty in Artificial Intelligence, Aug. 7-10, 2003 8 pages.

(Continued)

*Primary Examiner*—Michael B Holmes
(74) *Attorney, Agent, or Firm*—Wolf, Greenfield & Sacks, P.C.

(57) ABSTRACT

The present invention relates to a system and methodology to facilitate collaboration and communications between entities such as between automated applications, parties to a communication and/or combinations thereof. The systems and methods of the present invention include a service that supports collaboration and communication by learning predictive continuous time Bayesian models that provide forecasts of one or more aspects of a users' presence and availability. Presence forecasts include a user's current or future locations at different levels of location precision and usage of different devices or applications. Availability assessments include inferences about the cost of interrupting a user in different ways and a user's current or future access to one or more communication channels. The predictive models are constructed from data collected by considering user activity and proximity from multiple devices, in addition to analysis of the content of users' calendars, the time of day, and day of week, for example. Various applications are provided that employ the presence and availability information supplied by the models in order to facilitate collaboration and communications between entities.

33 Claims, 17 Drawing Sheets

U.S. PATENT DOCUMENTS

| | | | |
|---|---|---|---|
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,659,593 | A | 8/1997 | Tzvieli |
| 5,812,865 | A | 9/1998 | Theimer et al. |
| 5,930,828 | A | 7/1999 | Jensen et al. |
| 6,021,403 | A | 2/2000 | Horvitz et al. |
| 6,246,376 | B1 | 6/2001 | Bork et al. |
| 6,262,730 | B1 | 7/2001 | Horvitz et al. |
| 6,321,158 | B1 | 11/2001 | DeLorme et al. |
| 6,353,398 | B1 | 3/2002 | Amin et al. |
| 6,466,232 | B1 | 10/2002 | Newell et al. |
| 6,499,021 | B1 | 12/2002 | Abu-Hakima |
| 6,513,046 | B1 | 1/2003 | Abbott, III et al. |
| 6,549,915 | B2 | 4/2003 | Abbott, III et al. |
| 6,672,506 | B2 | 1/2004 | Swartz et al. |
| 6,741,188 | B1 | 5/2004 | Miller et al. |
| 6,747,675 | B1 | 6/2004 | Abbott et al. |
| D494,584 | S | 8/2004 | Schlieffers et al. |
| 6,791,580 | B1 | 9/2004 | Abbott et al. |
| 6,796,505 | B2 | 9/2004 | Pellaumail et al. |
| 6,801,223 | B1 | 10/2004 | Abbott et al. |
| 6,812,937 | B1 | 11/2004 | Abbott et al. |
| 6,837,436 | B2 | 1/2005 | Swartz et al. |
| 6,842,877 | B2 | 1/2005 | Robarts et al. |
| 6,978,258 | B2 | 12/2005 | Chithambaram |
| 7,010,501 | B1 | 3/2006 | Roslak et al. |
| 7,040,541 | B2 | 5/2006 | Swartz et al. |
| 7,063,263 | B2 | 6/2006 | Swartz et al. |
| 7,171,378 | B2 | 1/2007 | Petrovich et al. |
| 7,195,157 | B2 | 3/2007 | Swartz et al. |
| 7,233,933 | B2 * | 6/2007 | Horvitz et al. ............... 706/21 |
| 7,385,501 | B2 | 6/2008 | Miller |
| 7,493,369 | B2 * | 2/2009 | Horvitz et al. ............. 709/207 |
| 7,519,564 | B2 * | 4/2009 | Horvitz ....................... 706/12 |
| 7,539,532 | B2 * | 5/2009 | Tran ........................ 600/509 |
| 7,539,533 | B2 * | 5/2009 | Tran ........................ 600/509 |
| 7,558,622 | B2 * | 7/2009 | Tran ........................ 600/509 |
| 2001/0030664 | A1 | 10/2001 | Shulman et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2001/0045949 | A1 | 11/2001 | Chithambaram et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0076025 | A1 | 6/2002 | Liversidge et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0159750 | A1 | 10/2002 | Jasinschi et al. |
| 2002/0191034 | A1 | 12/2002 | Sowizral et al. |
| 2003/0046401 | A1 | 3/2003 | Abbott et al. |
| 2003/0154476 | A1 | 8/2003 | Abbott, III et al. |
| 2004/0070602 | A1 | 4/2004 | Kobuya et al. |
| 2004/0117443 | A1 | 6/2004 | Barsness |
| 2004/0201500 | A1 | 10/2004 | Miller et al. |
| 2005/0034078 | A1 | 2/2005 | Abbott et al. |
| 2005/0266858 | A1 | 12/2005 | Miller et al. |
| 2005/0272442 | A1 | 12/2005 | Miller et al. |
| 2006/0019676 | A1 | 1/2006 | Miller et al. |
| 2007/0071209 | A1 | 3/2007 | Horvitz et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |

OTHER PUBLICATIONS

Uri Nodelman, et al., Continuous Time Bayesian Networks, Proceedings of the Eighteenth International Conference on Uncertainty in Artificial Intelligence, Aug. 1-4, 2002, 10 pages.

Eric Horvitz, et al., Coordinate: Probabilistic Forecasting of Presence and Availability, Proceedings of the 18th Conference on Uncertainty and Artificial Intelligence, Jul. 2002, pp. 224-233. Morgan Kaufmann Publishers, Edmonton, Alberta.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages., vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Bob Metcalfe, After 35 Years of Technology Crusades, Bob Metcalfe Rides Off Into the Sunset, InfoWorld, Sep. 25, 2000, ITworld.com web pages 1-3, at: http://www.itworld.com/AppDev/1161/IWD000925opmetcalfe_cto/. Last accessed on May 4, 2006.

Eric Horvitz, et al., Attention-Sensitive Alerting, Jul. 1999, Proceedings of the UAI '99 Conference on Uncertainty and Artificial Intelligence, Morgan Kaufman: San Francisco, pp. 305-313.

Eric Horvitz, Principles of Mixed-Initiative User Interfaces, Artificial Intelligence Journal, Elsevier Science, Feb. 2001, vol. 126, pp. 159-196.

Albrecht et al., Towards a Bayesian Model for Keyhole Plan Recognition in Large Domains, Proceedings of User Modeling '97, Springer-Verlag, New York, 1997, pp. 365-376.

Beard et al., Visual Calendar for Scheduling Group Meetings, Proceedings of CSCW '90, ACM Press, Oct. 1990, pp. 279-290.

Chickering et al., a Bayesian Approach to Learning Bayesian Networks with Local Structure, Proceedings of UAI '97, Morgan Kaufmann Publishers, Providence, Rhode Island, Aug. 1997, pp. 80-89.

Conati et al., On-Line Student Modeling for Coached Problem Solving Using Bayesian Networks, User Modeling: Proceedings of the Sixth International Conference UM'97, Vienna, New York, 1997, pp. 231-242.

Cutrell et al., Notification, Disruption, and Memory: Effects of Messaging Interruptions on Memory and Performance, Proceedings of Interact 2001: IFIP Conference on Human-Computer Interaction, Tokyo, Japan, Jul. 2001, 7 pages.

Czerwinski et al., Instant Messaging: Effects of Relevance and Timing, in Turner et al. (Eds) People and Computers XIV: Proceedings of HCI 2000, vol. 2, British Computer Society, 2000 p. 71-76.

Gillie et al., What Makes Interruptions Disruptive? A Study of Length, Similiarity and Complexity, Psychological Research, Springer-Verlag, 1989, vol. 50, pp. 243-250.

Hinckley et al., Sensing Techniques for Mobile Interaction, Proceedings of the ACM UIST 2000 Symposium on User Interface Software and Technology, San Diego, California, Nov 2000, CHI Letters 2, (2), pp. 91-100.

Hinckley et al., Toward More Sensitive Mobile Phones, Proceedings of the ACM UIST 2001 Symposium on User Interface Software and Technology, Orlando, Florida, Nov 2001, CHI Letters 3, (2), pp. 191-192.

Horvitz et al., The Lumiere Project: Bayesian User Modeling for Inferring the Goals and Needs of Software Users, Proceedings of UAI '98, Morgan Kaufmann Publishers, Madison, Wisconsin, Jul. 1998, pp. 256-265.

Horvitz, Principles of Mixed-Initiative User Interfaces, Proceedings of the ACM SIGCHI '99, ACM Press, Pittsburgh, Pennsylvania, May 1999 pp. 159-166.

Hudson et al., I'd be Overwhelmed, But It's Just One More Thing to Do, Availability and Interruption in Research Management, Proceedings of CHI 2002, Minneapolis, Minnesota, Apr. 2002, CHI Letters 4, (1), pp. 97-104.

Maes, P., "Agents that Reduce Work and Information Overload," Communications of the ACM 37(7), Jul. 1994.

McCrickard et al., Establishing Tradeoffs that Leverage Attention for Utility, Empirically Evaluating Information Display in Notification Systems, International Journal of Human-Computer Studies, 2003, vol. 58, pp. 547-582.

McFarlane, Coordinating the Interruption of People in Human-Computer Interaction, Human-Computer Interaction-INTERACT '99m, IOS Press, Inc., The Netherlands, 1999, pp. 295-303.

Mynatt et al, Inferring Calendar Event Attendance, Proceedings of Intelligent User Interfaces (IUI) '01, Santa Fe, New Mexico, Jan. 14-17, 2001, pp. 121-128.

Palen, Social, Individual, and Technological Issues for Groupware Calendar Systems, Proceedings of the ACM CHI '99, Pittsburgh, Pennsylvania, May 15-20. 1999, pp. 17-24.

Platt, Probabilistic Outputs for Support Vector Machines and Comparisons to Regularized Likelihood Methods, in Smola et al., (Eds) Advances in Large Margin Classifers, MIT Press, Mar. 26, 1999, 11 pages.

\* cited by examiner

CONTINUOUS TIME BAYESIAN NETWORK MODELS FOR PREDICTING USERS' PRESENCE, ACTIVITIES, AND COMPONENT USAGE

REFERENCE TO RELATED APPLICATIONS

This application is a continuation in part of U.S. patent application Ser. No. 10/609,972 filed on Jun. 30, 2003, entitled METHODS AND ARCHITECTURE FOR CROSS-DEVICE ACTIVITY MONITORING, REASONING, AND VISUALIZATION FOR PROVIDING STATUS AND FORECASTS OF A USERS' PRESENCE AND AVAILABILITY, the entirety of which is incorporated herein by reference. This application is also a continuation in part of U.S. patent application Ser. No. 09/894,087 filed on Jun. 28, 2001, entitled METHODS FOR AND APPLICATIONS OF LEARNING AND INFERRING THE PERIODS OF TIME UNTIL PEOPLE ARE AVAILABLE OR UNAVAILABLE FOR DIFFERENT FORMS OF COMMUNICATION, COLLABORATION, AND INFORMATION ACCESS, the entirety of which is incorporated herein by reference.

TECHNICAL FIELD

The present invention relates generally to computer systems, and more particularly to a system and method that supports collaboration and communication by collecting data from one or more devices, and that learns predictive models that provide forecasts of users' presence and availability. More specifically, the methods and architecture provide information to people or communication agents about the current or future status of a user's presence and availability in accordance with continuous time Bayesian network models, wherein the information can be provided at multiple locations and/or relating to the user's access to one or more devices or channels of communication.

BACKGROUND OF THE INVENTION

Although electronic calendar systems for storing reminders and creating contacts with others about meeting times and locations provide one type of opportunity for people to collaborate, a great deal of collaboration is based on opportunistic communication arranged under uncertainty. This informal coordination between people often depends on peoples' shared understandings about current and future locations and activities of friends and associates. Even with employment of online group calendar systems, for example, people are often challenged with trying to understand how available others are for a respective collaboration such as knowing what the current status of someone they are trying to contact. However, knowing a person's current status does not necessarily facilitate future or desired collaboration between communicating parties.

In just one example, conventional e-mail systems provide an example of communications and message coordination difficulties between parties. In one possible scenario, an employee may be situated in a foreign country or remote region, wherein voice communications via telephone or other medium is not always possible. The employee may have indicated beforehand to fellow workers, supervisors and loved ones that e-mail provides the most reliable manner in which the employee will actually receive and be able to subsequently respond to a message. Although, conventional e-mail systems can indicate that a transmitted message has been received and opened by the employee, and can include a predetermined/pre-configured reply such as "On vacation for one week", or "Out of the office this afternoon"—assuming the employee remembers to configure the e-mail system, there is currently no automatically generated indication provided to the message sender when and/or how long it will be before the employee may actually respond. Thus, if a home crisis situation were to occur or an important business message needed to get through, message senders can only guess when the employee will potentially receive the message and hope that the message is received and responded to in a timely manner. Similar difficulties arise when attempting to schedule meetings with parties that are difficult to determine whether or not they can attend a meeting set for some time in the future.

As is common in everyday situations, messages are transmitted with varying degrees of urgency, importance, and priority. Often, key meetings need to be arranged at a moments notice in order to address important business or personal issues. Consequently, one or more messages are directed to one or more parties to indicate the urgency of the meeting. Also, messages are often communicated over multiple communications modalities in order to attempt to reach potential parties. For example, a business manager may send e-mails to key parties and follow the e-mail with phone calls, pages or faxes to the parties, wherein voice mails are typically left for non-answering parties. Unfortunately, the manager is often unsure whether non-responding parties have received the messages and is often unable to determine with any degree of confidence when all parties may be available to meet. Therefore, even though modem communications systems have enabled messages to be rapidly transmitted anywhere in the world over a plurality of mediums, there is a need for a system and methodology to provide improved coordination, communication, and collaboration between parties and to mitigate uncertainty associated with when and/or how long it will be before a message recipient receives a particular message.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that support collaboration and communication by learning predictive models that provide forecasts of users' presence and availability. The models are formulated in accordance with continuous time Bayesian networks for predicting users' presence, activities, and component usage. Continuous time Bayesian networks (CTBNs) describe structured stochastic processes with finitely many states that evolve over continuous time. A CTBN is a directed (possibly cyclic) dependency graph over a set of variables, each of which represents a finite state, continuous time Markov process whose transition model is a function of its parents. In general, the present invention describes a two-tiered influence model including presence and an application on top. Other variables can be added such as day or time of the week, and time since a user will next use an application. Based upon these models, determinations can be made to support a plurality of applications. The determinations include predicting the future values of these variables, in order to answer questions such as the following examples:

When is it next expected that a user will be present on their computer? or When is it expected that the user will next use a particular application? or How much time is it expected that the person will remain on their computer? or How much time before it is expected that the user will switch to a different application? and so forth. Determining automatically generated answers to these and other questions supports a plurality of different applications for coordinating communications and interactions between users.

Data is collected by considering user activity and proximity from multiple devices, in addition to analysis of content of users' calendars, time of day, and day of week, for example, wherein the data is employed to construct one or more learning models to forecast users' presence and availability. The present invention facilitates real-time, peri-real time, and/or long-term planning for messaging and collaboration by providing probabilistic predictions about current and future states of users to authorized persons and/or automated applications (e.g., states such as time until someone will arrive or leave a location, will be at a location for at least time t, time will have access to a device, time will review e-mail, time will finish a conversation in progress, time will attend a meeting, and so forth). Predictions received by such persons or applications can then be employed to facilitate more efficient and timely communications between parties since parties or systems attempting to communicate can be given forecasts or clues to possible periods or devices in which to reach the user based upon trained observances of past user activities.

In one aspect of the present invention, a Bayesian inference system is provided that supports availability forecasting machinery and systems within the framework of various automated applications. To build general predictive models, data is collected or aggregated regarding a user's activity and location from multiple sources, including data about a user's activities on multiple devices in addition to data from a calendar, for example. Also, forecasts can be generalized with respect to presence and absence to other events of interest to support collaboration and communication. For example, it may be desirable for users or applications to understand if and when a user will access messages waiting in their inbox, or to identify a suitable future time to interrupt the user with a notification.

Other aspects include forecasting when a user will have easy access to computing systems of communication devices with particular capabilities. For example, automated systems or other users may desire to know when a user will likely have easy access to a computer with full video conferencing abilities. Furthermore, the present invention provides sophisticated models for handling multiple contextual clues such as details captured in calendar information, rather than simply conditioning on the existence of a meeting.

The forecasted presence and availability information described above can be utilized by many applications. For example, the present invention can be employed to facilitate meetings, coordination and communications between message senders and receivers, wherein general prediction models are constructed from past presence, actions, and calendar of a user to forecast the timing of a user's availability status for receiving messages, receiving communications and/or participating in meetings. Such inferences can be utilized to report or display the user's status to colleagues globally and/or selectively (depending on the colleague's relationship with the user), and can be employed in a variety of applications such as automated meeting or interactive communications schedulers or re-schedulers, smart caching systems and communication relay systems.

Other applications of the invention are feasible, including finer grained inferences other than the notion of availability. For example, the present invention can employ similar methods to reason about the amount of time until a user will be available for a particular kind of interaction or communications, based on patterns of availability and context. For example, the expected time until a user, who is currently traveling in automobile will be available for a voice and/or videoconference can be determined by learning statistics and building models which can infer this particular kind of availability. In another example, it can be determined when a user will be available to be interrupted with a particular class of alert or notification, based on patterns of availability, and inferences about the workload and associated cost of an interruption.

In another aspect of the present invention, the predictive component on availability is utilized to estimate when a user will likely be in a setting where he/she can or will review messages deemed as urgent and received by a user's system are answered with an adaptive out-of-office message, such as when the message will likely be unseen for some amount of time and/or the message is at least of some urgency, and/or is from one or more people of particular importance to the user. Such selective messages can be populated with dynamically computed availability status, centering for example, on a forecast of how long it will be until the user will likely review a message such as an e-mail, or be available to review the message, or be in a particular situation (e.g., "back in the office"). Other aspects can include determining the time until a user will review different kinds of information, based on review histories, and the time until the user will be in one or more types of settings, each associated with one or more types of feasible communications. Such information can be transmitted to a message sender regarding the user's ability or likelihood to engage in communications, or respond within a given timeframe.

The present invention can employ the information regarding the user's likelihood of return or current availability in other systems and processes. This may include voice mail systems, calendaring systems, scheduling systems, automated maintenance systems, automated agents, and user tracking systems in order to provide useful information feedback to message senders and/or systems regarding the likelihood of establishing contact and making informed decisions based upon the user's expected presence and availability.

In another aspect of the present invention, systems and methods are provided that build and use models of a user's attentional focus and workload as part of harnessing the role of interruptions on users. These methods can reason about a user's workload from observed events and, more specifically, infer the cost of interruption to users associated with different kinds of alerting and communications. Such models of interruption fuse together information from multiple sensory channels, including desktop events, analysis of calendar information, visual pose, and ambient acoustical analyses, for example.

Models can be constructed to infer a user's state of interruptability from multiple event sources, and, that can provide a well-characterized expected cost of interruption. This can include coupling of models of attention with event systems that provide streams of events, including desktop activity and sensory observations. Also, the present invention can infer an expected cost of interruption, given a probability distribution over attention and a utility assessment that encodes preferences about the costs of interruption in different situations in addition to the learning of models of attention and interruptablity from data. A learning paradigm is processed along with a set of tools (e.g., interruption workbench), wherein learned models are reviewed, and experiments provided that probe the classification accuracy of the models. A "model ablation" study is also considered, removing from consideration perceptual sensing, and including the discriminatory power of events representing interactions with a client computing system and calendar information, for example.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
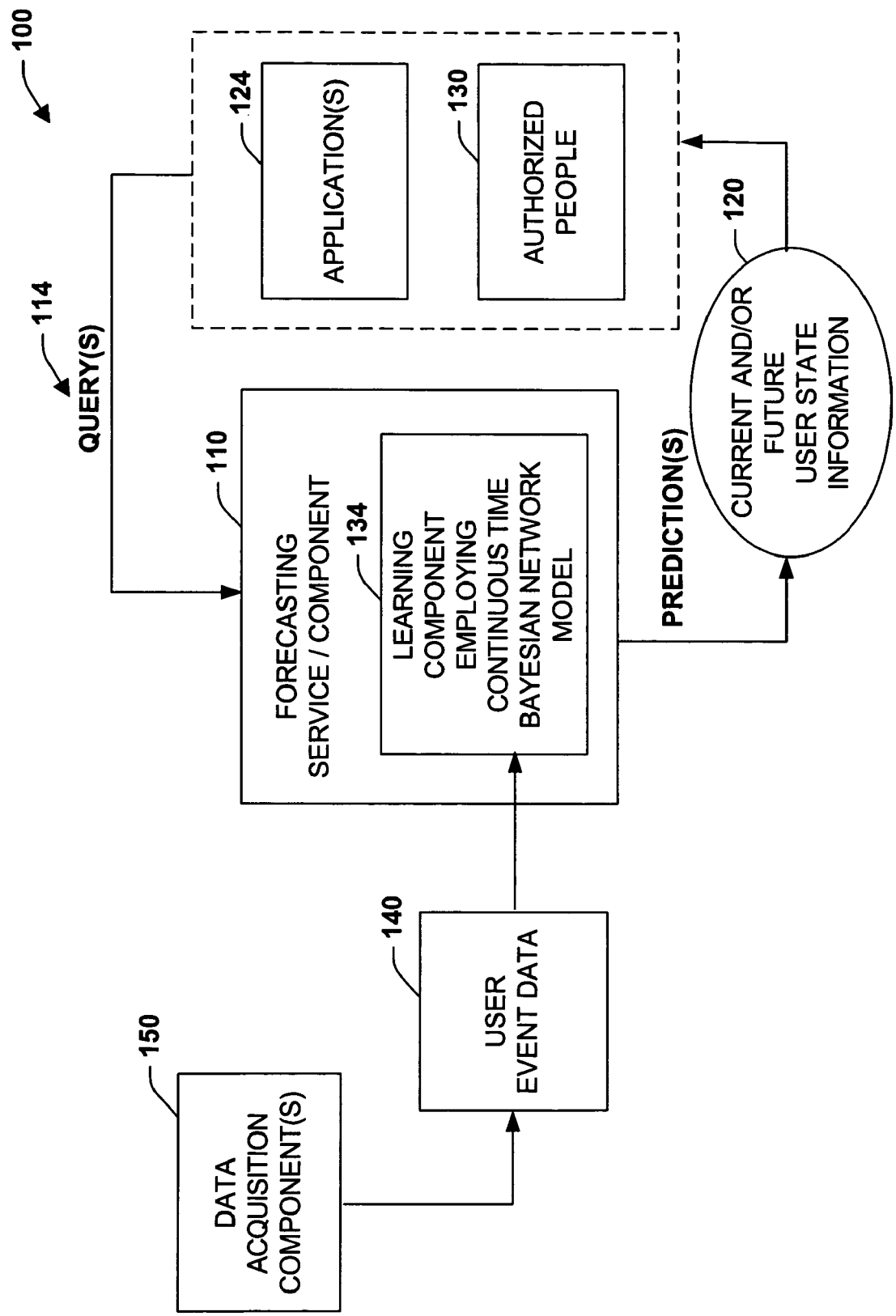
FIG. 1 is a schematic block diagram of a forecasting system in accordance with an aspect of the present invention.

The present invention relates to a system and methodology to facilitate collaboration and communications between entities such as between automated applications, parties to a communication and/or combinations thereof. The systems and methods of the present invention include a service (e.g., web service, automated application) that supports collaboration and communication by learning predictive models that employ continuous time Bayesian networks that provide forecasts of one or more users' presence and availability. The predictive models are constructed from data collected by considering user activity and proximity from multiple devices, in addition to analysis of the content of users' calendars, the time of day, and day of week, for example. Various applications are provided that employ the presence and availability information supplied by the models in order to facilitate collaboration and communications between entities.

Some example applications can include automated meeting or interactive communications schedulers or re-schedulers, smart caching systems, communication systems, audio systems, calendaring systems, scheduling systems, notification systems, messaging systems, automated maintenance systems, automated agents, video systems, digital assistants, and user tracking systems, for example, in order to provide useful information to message senders and/or systems regarding the likelihood of establishing contact and making informed decisions based upon the user's expected presence and availability.

It is noted that Continuous Time Bayesian Networks (CTBNs) can be employed in system management operations in addition to the presence and availability forecasting described above. For instance, CTBNs can be utilized for predictive modeling for the allocation of resources in an operating system, based on expectations under uncertainty on when different resources and information will be needed by various components. Thus, models can be constructed to predict resources requirements of the operating system (e.g., moving components in memory to increase performance, lowering the priority of applications that will likely not be used for some period of time, setting operating system variables, performing system maintenance) and to automatically initiate changes within the system based upon the predictions. For example, this can include determining which components will be best to store in a memory cache, or to be exchanged to another memory location in order to free-up cache memory for pages that are most likely to be used. In addition to operating system memory management, the models can be applied to pre-fetching operations, interrupt processing, dynamic performance optimization and, more generally, speculative computing.

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates presence and availability forecasting in accordance with an aspect of the present invention. A forecasting service 110 (or forecasting component) receives one or more queries 114 regarding an identified user's (or users) presence or availability and generates one or more predictions relating to current and/or future states 120 of the identified user or users. The query 114 and returned states 120 are generated and received by one or more automated applications and/or authorized people 130, however, it is to be appreciated that the state information 120 can be generated without receiving the query 114 (e.g., a scheduling system that automatically sends manpower availability reports to managers at a predetermined interval). In general, the query 114 is originated by the applications, the authorized people 130, or other entities in order to obtain answers regarding the presence, availability, location, communications capability, device availability and so forth of the identified user or users. It is noted however, that complementary information may also be queried and answered respectively such as instead of presence information, the forecasting service 110 can provide how long a person is expected to be absent, or instead of availability information, how long a person may be unavailable, for example.

The query 114 may be directed to the forecasting service 110 to determine a plurality of different user states 120 such as for example:

The time until the user will arrive at or leave a location;
The time until the user will be at a location for at least time t;
The time until the user will have easy access to a device (e.g., full desktop system);
The time until the user will review e-mail or other message;
The time until the user will finish a conversation in progress;
Likelihood user will attend a meeting;
Expected cost of interruption over time; and including substantially any time, location, device, and/or communication-based prediction or answer.

In order to generate the state information 120, the forecasting service 110 employs a learning component 134 that can include one or more learning models for reasoning about the user states 120. These models include continuous time Bayesian networks for predicting users' presence, activities, and component usage. Continuous time Bayesian networks (CTBNs) describe structured stochastic processes with finitely many states that evolve over continuous time. A CTBN is a directed (possibly cyclic) dependency graph over a set of variables, each of which represents a finite state, continuous time Markov process whose transition model is a function of its parents and are described in more detail below with respect to FIGS. 2-16. For further details on CTBN's, See "Learning Continuous Time Bayesian Networks" *Proceedings of the Nineteenth International Conference on Uncertainty in Artificial Intelligence* (pp. 451-458), Uri Nodelman, Christian R. Shelton, and Daphne Koller (2003).

The above models can also include substantially any type of system such as statistical/mathematical models and processes that include the use of Bayesian learning, which can generate Bayesian dependency models, such as Bayesian networks, naive Bayesian classifiers, and/or Support Vector Machines (SVMs), for example. Other type models or systems can include neural networks and Hidden Markov Models, for example. Although elaborate reasoning models can be employed in accordance with the present invention, it is to be appreciated that other approaches can also utilized. For example, rather than a more thorough probabilistic approach, deterministic assumptions can also be employed (e.g., no desktop activity for X amount of time may imply by rule that user is not at work). Thus, in addition to reasoning under uncertainty as is described in more detail below, logical decisions can also be made regarding the status, location, context, focus, and so forth of users and/or associated devices.

The learning component 134 can be trained from a user event data store 140 that collects or aggregates data from a plurality of different data sources associated with one or more users. Such sources can include various data acquisition components 150 that record or log user event data (e.g., cell phone, accelerometer, acoustical activity recorded by microphone, Global Positioning System (GPS), electronic calendar, vision monitoring equipment, desktop activity and so forth). Before proceeding with a more detailed discussion of the presence and availability forecasting of the present invention, it is noted that the forecasting service 110 can be implemented in substantially any manner that supports predictions and query processing. For example, the forecasting service 110 could be implemented as a server, a server farm, within client application(s), or more generalized to include a web service(s) or other automated application(s) that provide answers to automated systems 124 and/or authorized people 130.

It is noted that the present invention can determine and share specific types of sub-goals per a contacting user's interest in current status and in forecasts of presences and availabilities. These can include:

(1) locations, (e.g., user will return to their office within x minutes, user, currently sensed in office, will leave their office within x minutes, will be at location x within t minutes, etc.),
(2) interruptability (deterministic, e.g., low, med, high, or costs for different kinds of interruptions (e.g., expected cost of interruption with a phone call is $5.00, alert on desktop, $1.50, etc.),
(3) availability of communication channels (user will have cell phone available, office phone available, pager available, desktop system with large display that is networked, desktop system with MS NetMeeting software available),
(4) other situations (e.g., user's conversation in office will likely end in x minutes.)

Communications channels can be reasoned about directly or can be derived by linking channels with location. For example, links between channels and locations can be determined at set up time (or derived over time via monitoring) that the office contains the following channels: hardwired telephone, full-desktop systems with large display running with the following software applications: MS Office, MS NetMeeting, etc.). Such information about channels linked to locations can be stored in location and device schema, for example.

Relating to data models or schema, the present invention also provides methods (including easy-to-use user interfaces) for adding devices and locations to consideration of the system, making it easy for users to set up Coordinate services as described in more detail below with respect to FIG. 2. When a device is added, a user describes the device type, capturing channel information, etc., and location, e.g., this machine is at my office desk, versus this machine is a mobile laptop with a wireless access or this cell phone is always with me at these hours, etc. When a location is added, all devices that are available are associated with the location. Rich XML-based schema or data models can be provided for capturing device and location information. Device schema, location schema, and other schema provide rich templates for capturing properties of locations and devices. As can be appreciated, user interface and methods can be provided that interact with the schema and methods of the present invention for adding and removing devices and locations (and other monitored information, if desired).

It is further noted that the systems and methods of the present invention can also consider and process location information, gleaned from 802.11 signals and interfaces as one example. For example, a map of a corporate campus can be provided that maps current association points being seen (APs) with building location to indicate the user's location. At home, the system determines a home wireless is available and thus, the system determines when the user is home. Also, GPS signals can be processed for areas outside of wireless access.

Figure 2:
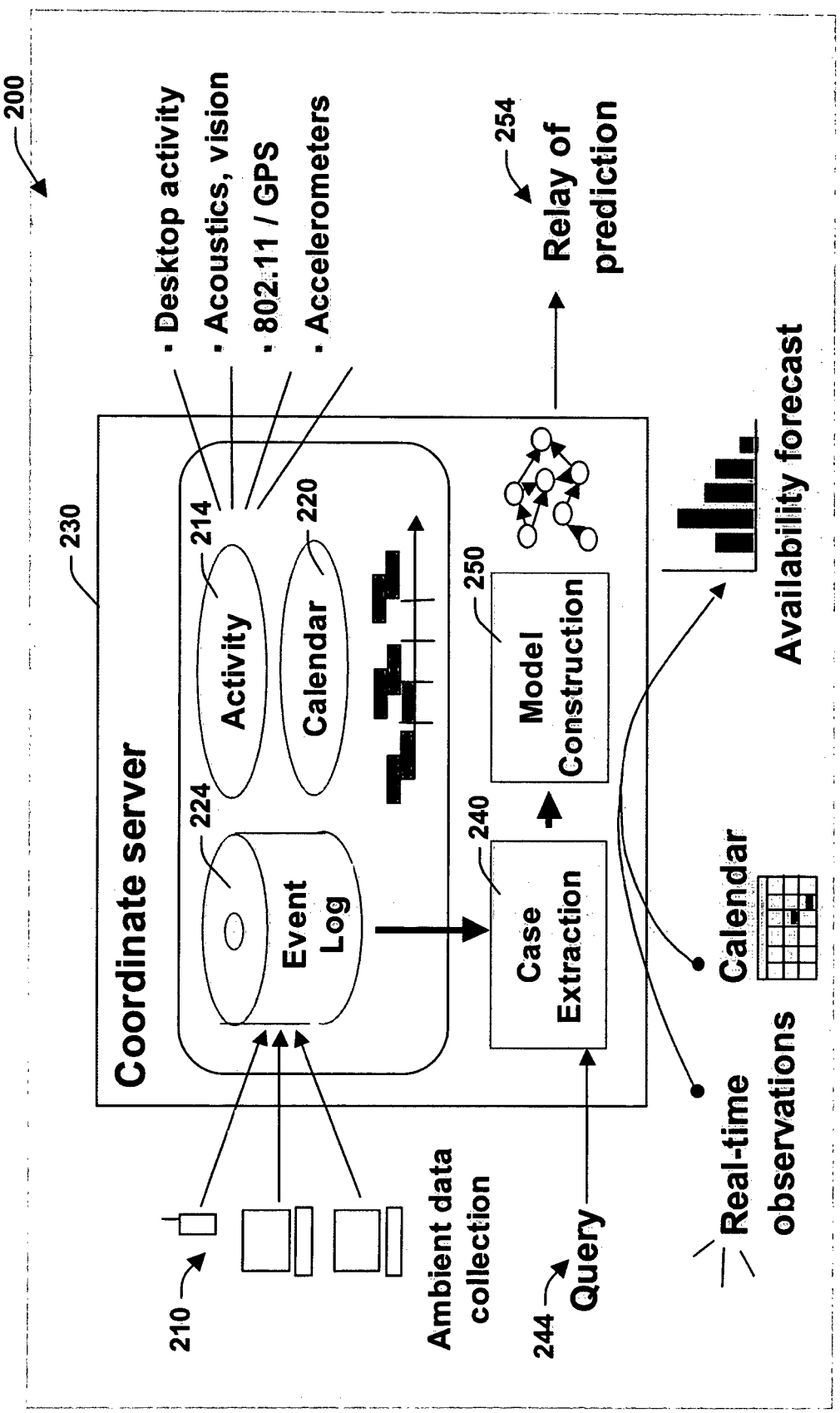
FIG. 2 is a schematic diagram of a Coordinate system in accordance with an aspect of the present invention.

Referring now to FIG. 2, a system 200 illustrates a Coordinate system 200 (also referred to as Coordinate 200) in accordance with an aspect of the present invention. In one aspect, the Coordinate system 200 can be built as a server-based service written in C# or other language and built on top of a NET development environment (or any commercially available development environment). The Coordinate system 200 includes a central database, networking facilities, device provisioning interfaces and controls, and Bayesian machine learning tools, for example. The system 200 can serve as a facility for use by automated proxies that provide information to collaboration and communication services for users rather than to be queried directly by users. However, a query interface as described below enables people or systems to directly query the forecasting or availability service provided by the Coordinate system 200.

The Coordinate system 200 is generally composed of four core components, however more or less than four components may be employed. A data-acquisition component 210 (or components) executes on multiple computers, components, or devices that a user is likely to employ. This component 210 detects computer usage activity 214, calendar information 220, time information, video, acoustical, position information from 802.11 wireless signal strength and/or GPS data when these channels are available (can also include input from substantially any electronic source). The data-acquisition component 210 includes a signal-processing layer that enables users to configure and define parameters of audio and video sources utilized to define user(s) presence. This information can be cached locally and sent to a Coordinate data-coalescence component 224 (also referred to as Event Log or Event database) running on a central Coordinate server 230. This component 224 is responsible for combining data from the user's multiple machines and storing it in an XML-encoded event database (can include other type encoding).

In general, multiple dimensions of a user's activities across multiple devices, and appointment status, as encoded in a calendar, are stored in a relational database. Start and stop times of interactions of different interactions and appointment status are encoded as distinct dimensions in a database. Static and dynamically constructed predictive models can be gleaned by making queries for information across these multiple dimensions of the database. Queries can be created dynamically, based on the current situation (e.g., the time of day and day of week and current transition status of a user for key transitions), and the predictive goal associated with a desired forecast (e.g., time until a communication channel will become available if it is not currently available).

Several procedures can be employed to build predictive models, including time series models such as those employing autoregression analysis, and other standard time series methods as commonly known, including such techniques as ARIMA models (e.g., See P. Dagum, P., A. Galper, E. Horvitz, A. Seiver, Uncertain reasoning and forecasting, International Journal of Forecasting 11(1):73-87, March 1995 (http://research.microsoft.com/~horvitz/FORECAST.HTM) for a review of alternate methods. Other methods include dynamic Bayesian networks and Continuous Time Bayesian Networks, two example forms of temporal Bayesian-network representation and reasoning methodology.

In one approach to reasoning with information from such a presence database, the present invention can learn Bayesian networks dynamically by acquiring a set of appropriate matching cases for a situation from the database, via appropriate querying of the database, and then employing a statistical analysis of the cases (e.g., employing a Bayesian-network learning procedure that employs model structure search to compose the best predictive model conditioned on the cases), and then using this model, in conjunction with a specific query at hand to make target inferences. In such a real-time learning approach, rather than attempting to build a large static predictive model for all possible queries, the method focuses analysis by constructing a set of cases 240 from the event database 224 that is consistent with a query 244 at hand.

This approach allows custom-tailoring of the formulation and discretization of variables representing specific temporal relationships among such landmarks as transitions between periods of absence and presence and appointment start and end times, as defined by the query 244. These cases 240 are fed to a learning and inference subsystem 250, which constructs a Bayesian network that is tailored for a target prediction 254. The Bayesian network is used to build a cumulative distribution over events of interest. In one aspect, the present invention employs a learning tool to perform structure search over a space of dependency models, guided by a Bayesian model score to identify graphical models with the greatest ability to predict the data. As noted above, substantially any type of learning system or process may be employed in accordance with the present invention. For example, one learning process that can be employed was developed by Chickering et al. in a publicly available paper on the Internet or other sources entitled "A Bayesian Approach to Learning Bayesian Networks with Local Structure" (MSR-TR-97-07, August 1997).

The Coordinate system 200 logs periods of presence and absence in the event log 224. Events are typically annotated by the source devices 210, whereby devices are defined by respective capabilities and locations. For example, a user can specify that certain devices have full-video conferencing abilities. The tagging of events by specific devices, indexed by capabilities allows the system 200 to forecast a probability distribution over the time until the user will have access to different kinds of devices without making a special plan. When these devices are assigned to fixed locations, such forecasts can be used to forecast a user's location. Coordinate's event system can monitor histories of a user's interaction with computing systems, including applications that are running on a system, applications that are now in focus or that have just gone out of focus. As an example, the system can identify when a user is checking email or reviewing a notification. Thus, moving beyond presence and absence, Coordinate 200 supports such forecasts as the time until a user will likely review email (or other communication), given how much time has passed since he or she last reviewed email. The system 200 also can consider the time until a user will engage an application or cease using the application. Thus, the system 200 can be queried when a user will likely access his or her email inbox given the time they last accessed their inbox. As the system 200 also detects conversations, other aspects include predicting when a current conversation is likely to end.

The system provides forecasts $p(t_e|E, \xi)$, where the is the time until an event of interest occurs, and evidence E includes proximal activity context, the time of day, day of week, and multiple attributes representing the nature of active calendar items under consideration. The proximal activity context represents one or more salient recent transitions among landmark states, based on the query. Such conditioning captures a modeling assumption that times until future states are strongly dependent on the timing of the most recent key landmarks. For predictions about the time until a user who has been absent will return to their office, or return to their office and remain for at least some time t, the proximal activity context is the period of time since the user transitioned from present to absent. For the forecasts about how long it will be before a user who is present will leave their office, or, more specifically, will be away for at least some time t, the proximal activity context is taken as the time since the user transitioned from absent to present.

Figure 3:
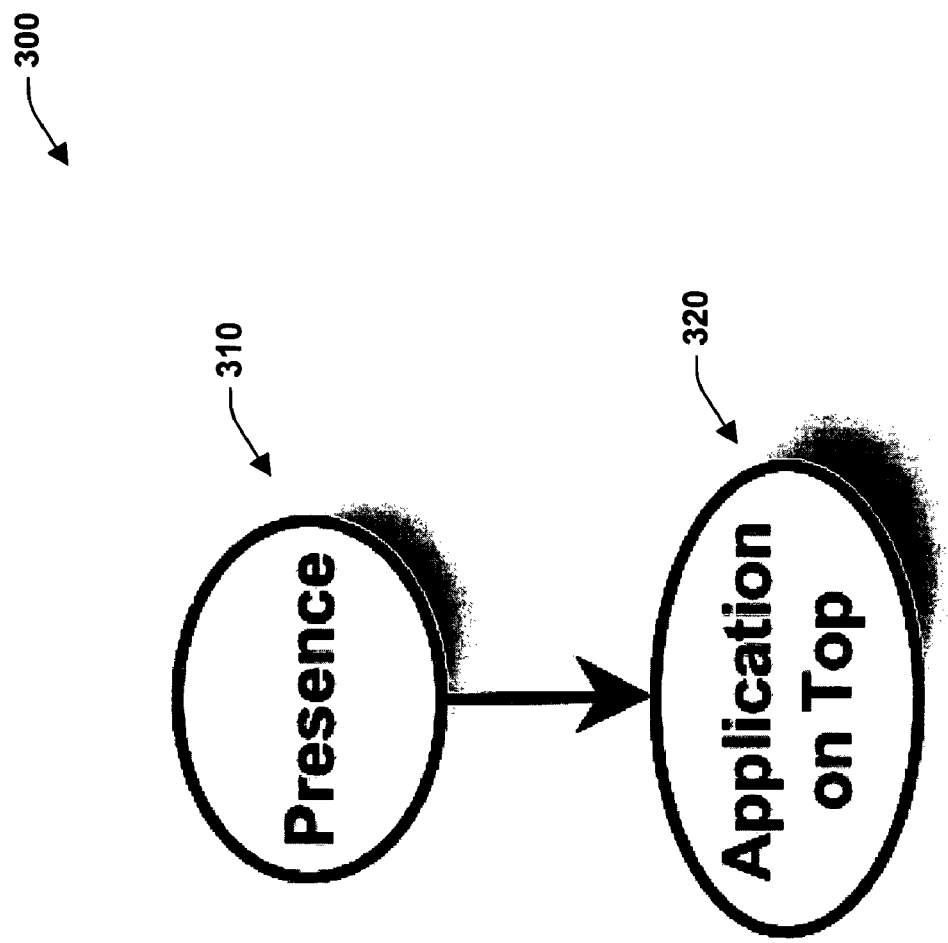
FIGS. 3-6 illustrate process models in accordance with an aspect of the present invention.

Before proceeding with a discussion of FIG. 3, it is noted that one or more graphical user interfaces can be provided in accordance with the present invention. It is further noted that the respective interfaces depicted can be provided in various other different settings and context. As an example, the applications and/or models discussed herein can be associated with a desktop development tool, mail application, calendar application, and/or web browser although other type applications can be utilized. These applications can be associated with a Graphical User Interface (GUI), wherein the GUI provides a display having one or more display objects (not shown) including such aspects as configurable icons, buttons, sliders, input boxes, selection options, menus, tabs and so forth having multiple configurable dimensions, shapes, colors, text, data and sounds to facilitate operations with the applications and/or models. In addition, the GUI can also include a plurality of other inputs or controls for adjusting and configuring one or more aspects of the present invention and as will be described in more detail below. This can include receiving user commands from a mouse, keyboard, speech input, web site, remote web service, pattern recognizer, face recognizer, and/or other device such as a camera or video input to affect or modify operations of the GUI.

Turning to FIG. 3, a process model 300 is illustrated in accordance with an aspect of the present invention. In this aspect, the model 300 describes two related processes: the presence of people on their computers at 310 and, while they are present on their computers, what application is "on top" at 320—ie., the application in which they are working currently. The model, at its core, has 2 variables: Presence and ApplicationOnTop. A Continuous Time Bayesian Network (CTBN) graph describing the overall process encompassing both variables can be drawn, wherein such a model can be employed to predict the future values of these variables, in order to answer questions such as for example:

1) When is it next expected that this user will be present on their computer?

2) When is it expected that this user will next use an Application?

3) How much time is expected that the user will remain on their computer?

4) How much time before it is expected that the user will switch to a different application? Automatically determining generated answers to these and other questions supports a plurality of different applications for coordinating communications and interactions between users.

Figure 4:
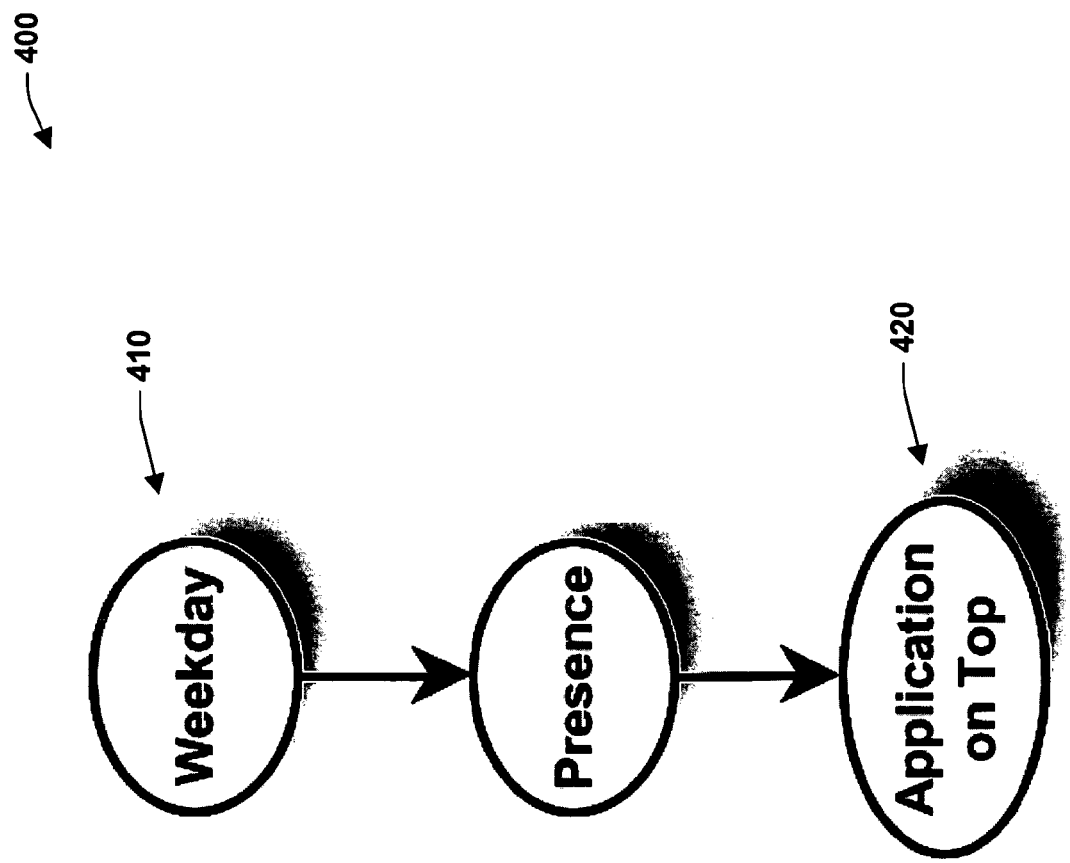

Referring to FIG. 4, an enhanced process model 400 is illustrated in accordance with an aspect of the present invention. In general, other information can be provided to make the model 300 described above more accurate. For example, the pattern of presence of a person on a computer often varies depending on whether it is a weekday or the weekend. Thus, another variable 410 can be added to the network describing this shift. A CTBN graph structure generally encodes an independence assumption: namely, if given the pattern of presence of a person on the computer, then the pattern of what application is on top does not depend on whether or not it is a weekday. If this assumption is untrue, then an additional arc from Weekday at 410 directly to ApplicationOnTop at 420 can be added. In general, both structure and parameters of these networks can be learned from data. After learning parameters for the CTBN, it can be used to plot the behavior of a system as illustrated in FIG. 5.

Figure 5:
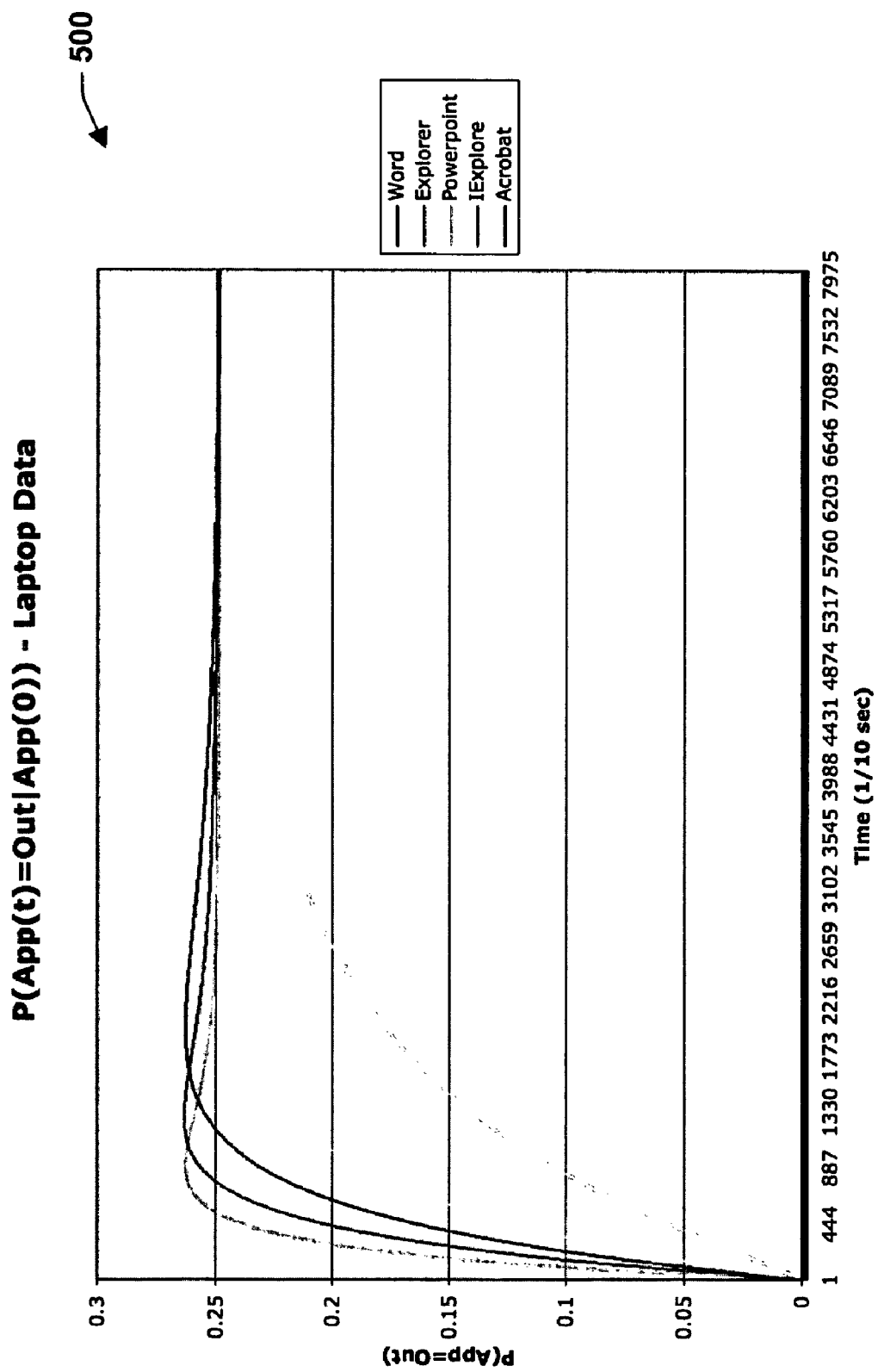

Referring to FIG. 5, a graph 500 shows the distribution over when a user enters a commercially available email program such as Outlook given that another application is currently being employed (e.g., Word, Explorer, PowerPoint, Internet Explorer, Adobe Acrobat, and so forth).

Figure 6:
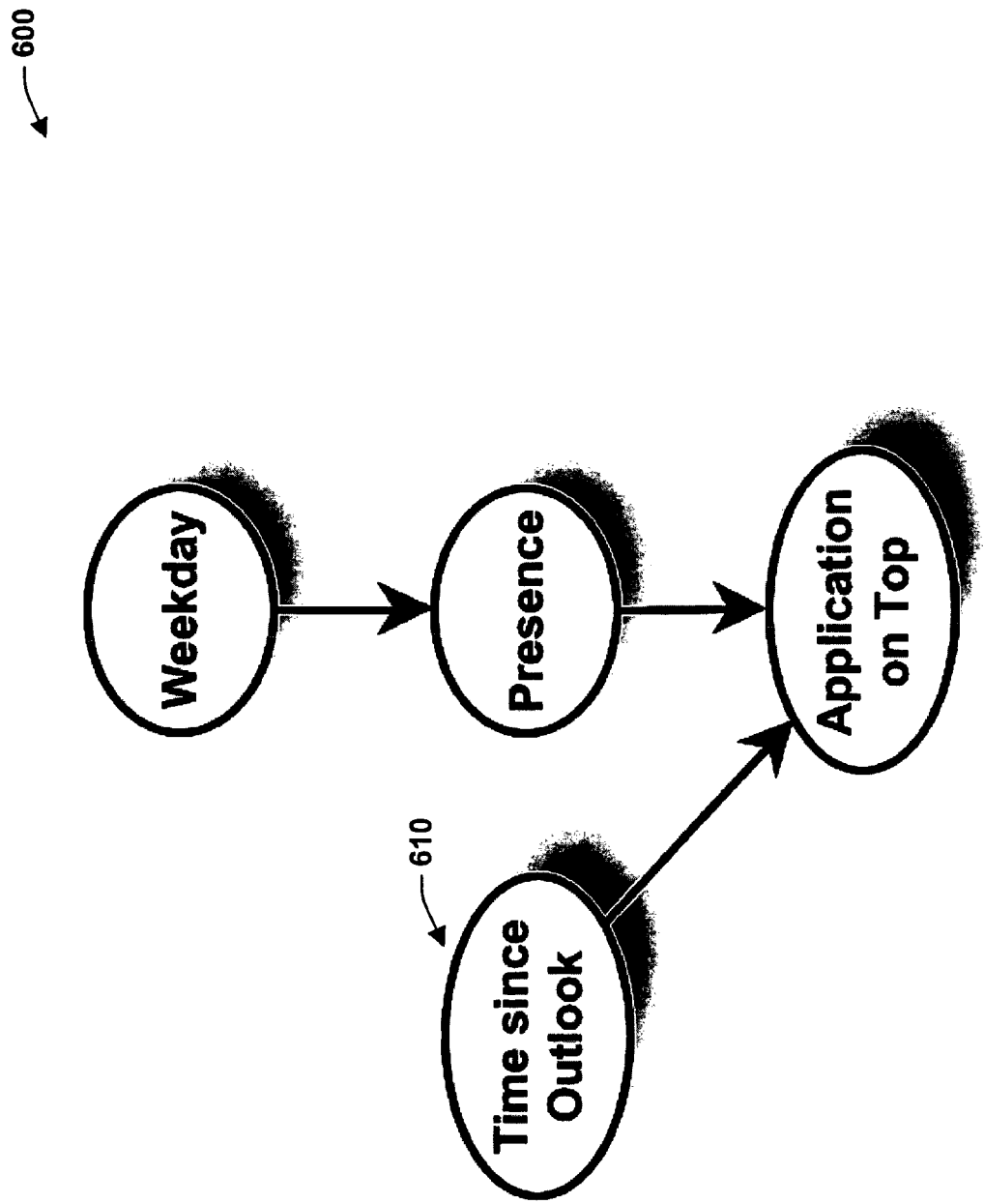

FIG. 6 illustrates an enhanced process model 600 in accordance with an aspect of the present invention. To determine when a person will next use an application such as Outlook, for example, a variable can be added that (in a discretized form) keeps track of how long it has been since the person last used the application at 610. Comparing CTBNs to other temporal models for validation can be challenging. Likelihood for Dynamic Bayesian Networks (DBNs) and CTBNs are generally not directly comparable. The following describes a process for comparing performance of CTBNs and other temporal models by using expected loss, wherein a class of loss functions that have the following properties can be defined as follows:

1. The total loss for a trajectory given a model is the sum of local losses, one for each transition of interest in the trajectory.
2. The local loss is a measure of how well that particular transition is predicted by the model.
3. The loss function is zero at the point of transition and nonnegative to the left and the right of the transition time.
4. The basic shape of the loss function may be linear, quadratic, exponential, etc.—with independent parameters for the left and right portions of the loss function.

For example, a linear loss function lin<alpha, beta, $t'$>($t$)=alpha($t'-t$) for $t<t'$beta($t-t'$) otherwise where t' is the actual time of transition and t is the predicted time of transition.

The parameters alpha and beta are slopes for the 2 linear portions of the loss function. Expected loss can then be computed as the expected value of the loss function given the distribution over when that transition will take place according to the model. The loss function can include a penalty term if the transition is not predicted by the model.

Figure 7:
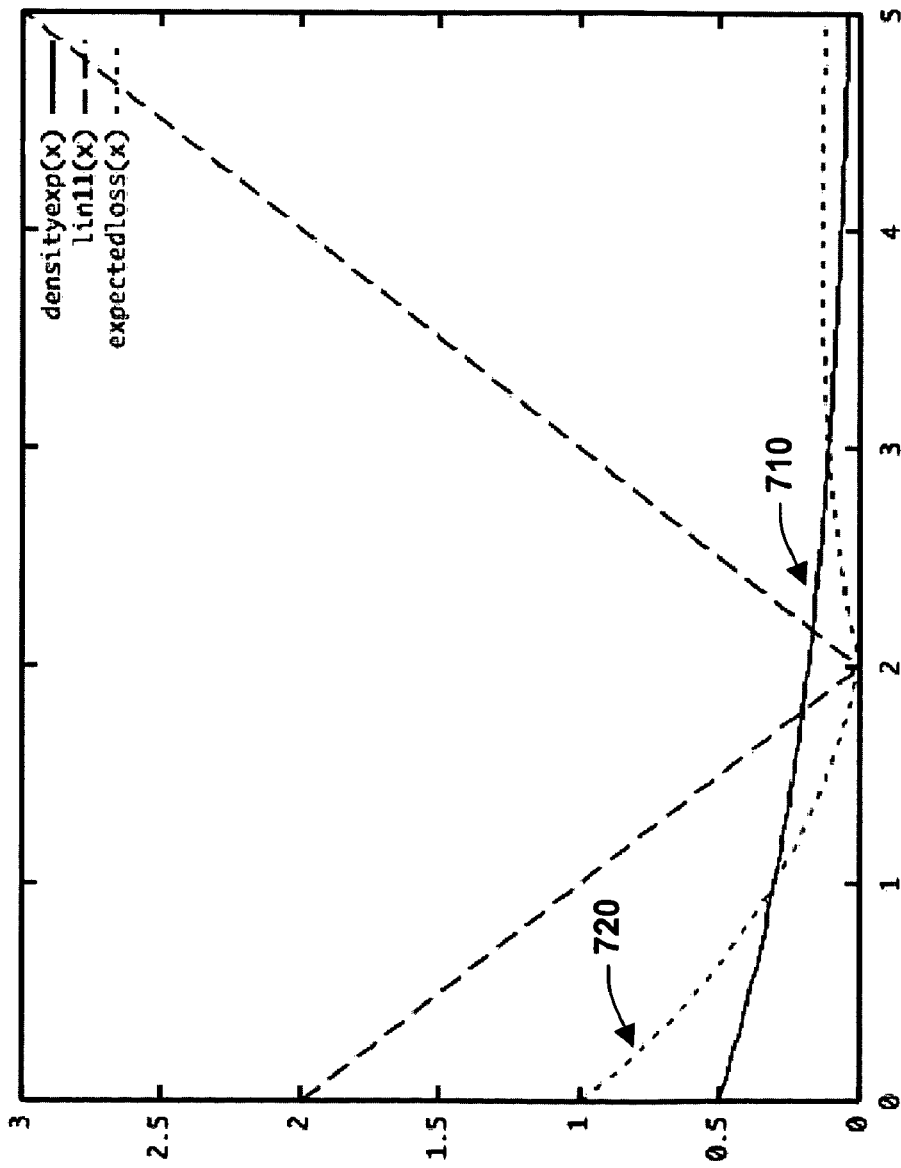
FIGS. 7-9 illustrate modeling functions in accordance with an aspect of the present invention.

FIG. 7 illustrates a graph 700 of a loss function of a lin<1, 1,2>(t) loss function with the CTBN (exponential) density over when that transition will occur along curve 710. (The exponential density has been chosen such that the mean is equal to the actual time of transition, t'=2.) A function 720 shows the product of the loss function and the density so that the expected loss is the area under the curve. Given the above linear loss function, it is possible to compute expected loss in closed form for a CTBN as a function of the relevant intensity parameter q and the actual time of transition t:

CTBNExpectedLoss($q,t$)=(alpha+beta)/$q$* exp($-qt$)+ alpha($t-1/q$)

Figure 8:
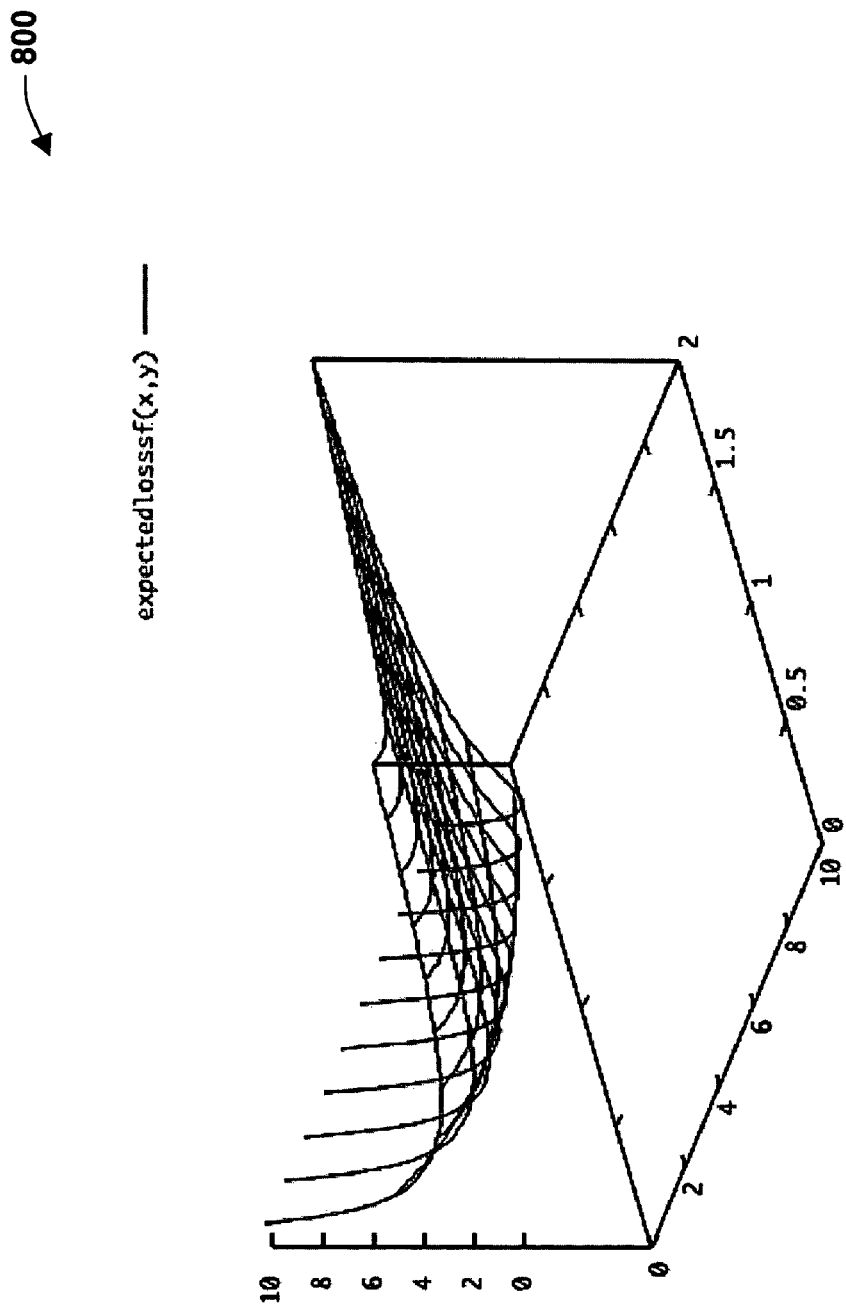

Proceeding to FIG. 8, given the above equation, an expected loss surface (z-axis) can be plotted on a graph 800 as a function of q (y-axis, from 0 to 2) and t (x-axis from 0 to 10). This is for the case where the actual time of transition is 2. It is noted that if q=0.5 then the expected time of transition is 2. In their standard form, CTBNs have an exponential distribution over when the next transition will occur given the complete state of the system at the initial time. An extension of the regular CTBN framework can be developed that allows a large class of phase distributions to be used in place of the exponential.

Formally, a phase distribution is the distribution over the time to absorption to an absorbing state of a continuous time Markov process. Phase distributions can be made that have almost any density (approximately)—though more complex distributions will generally require more parameters. (The Markov process that defines the phase distribution is made of several states or phases each of which can be parameterized independently.)

Figure 9:
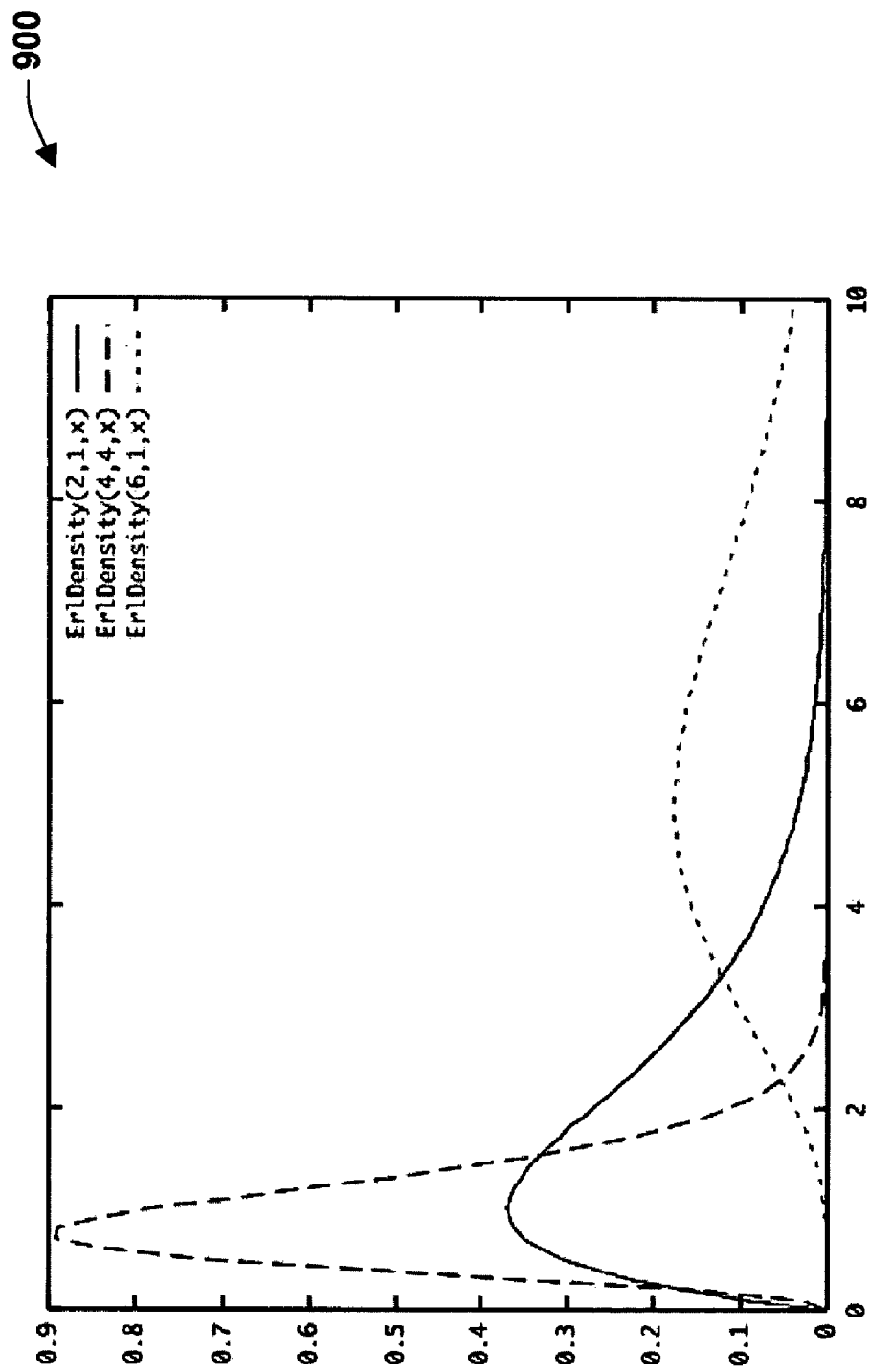
Figure 10:
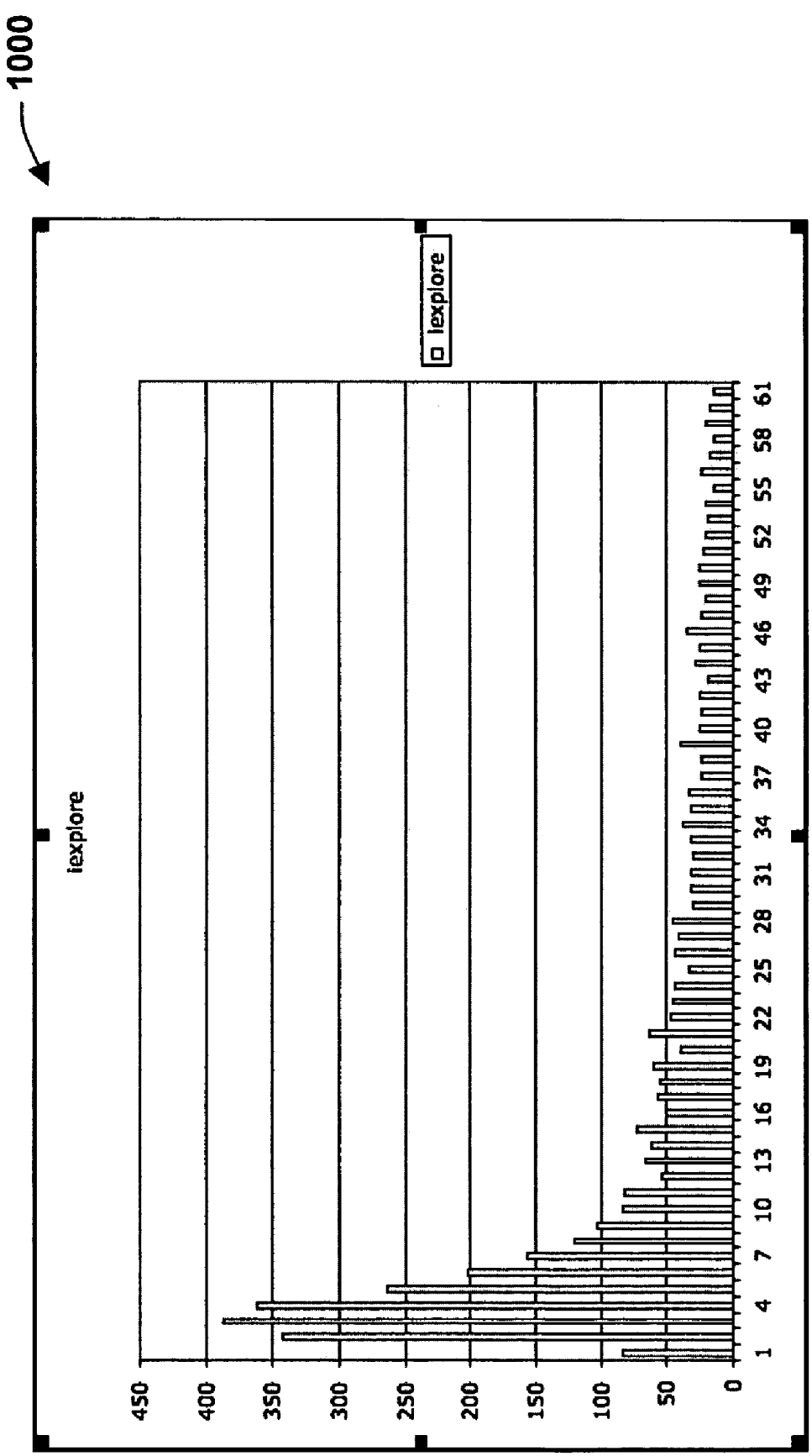
FIGS. 10-15 illustrate model performance data in accordance with an aspect of the present invention.
Figure 11:
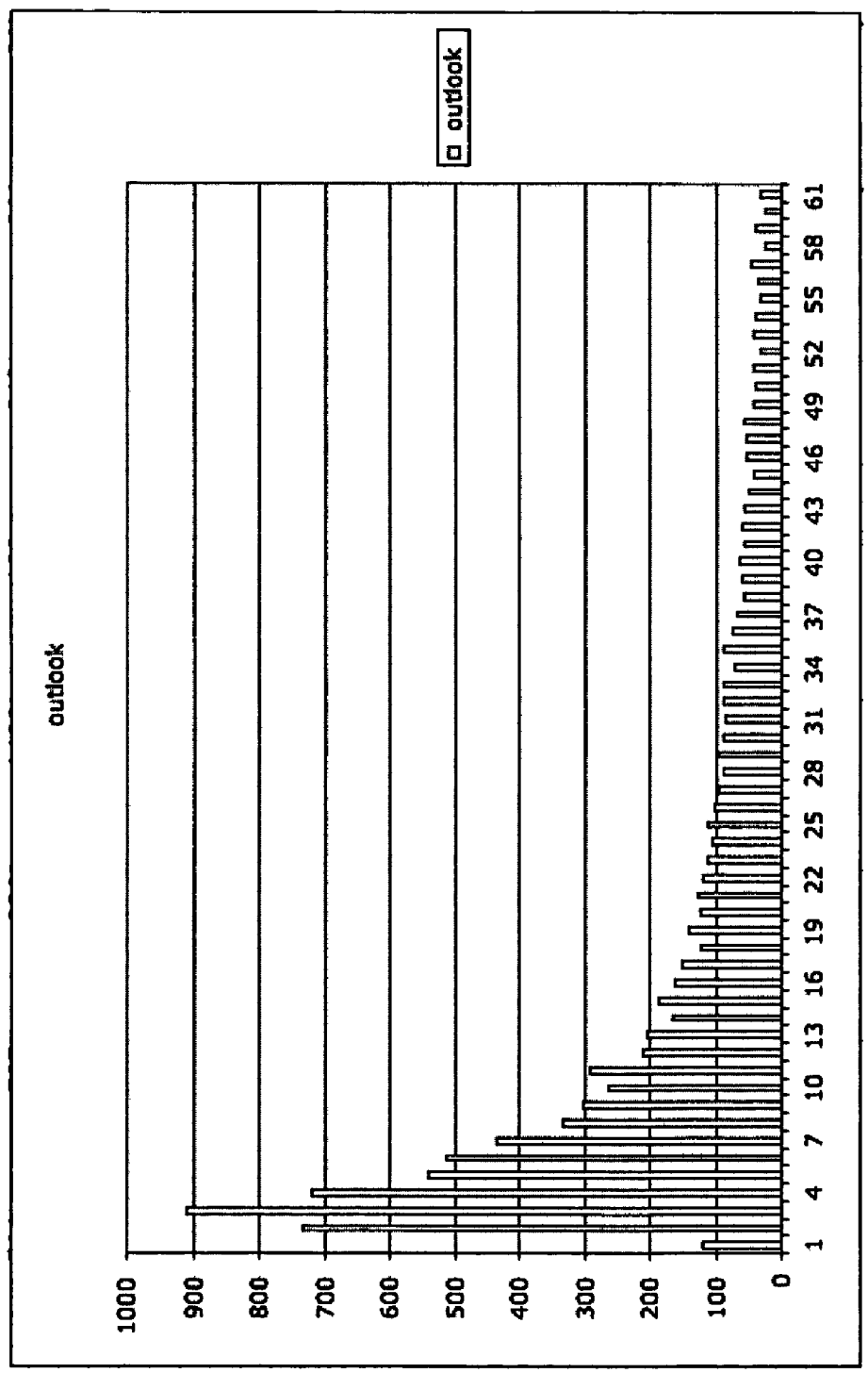
Figure 12:
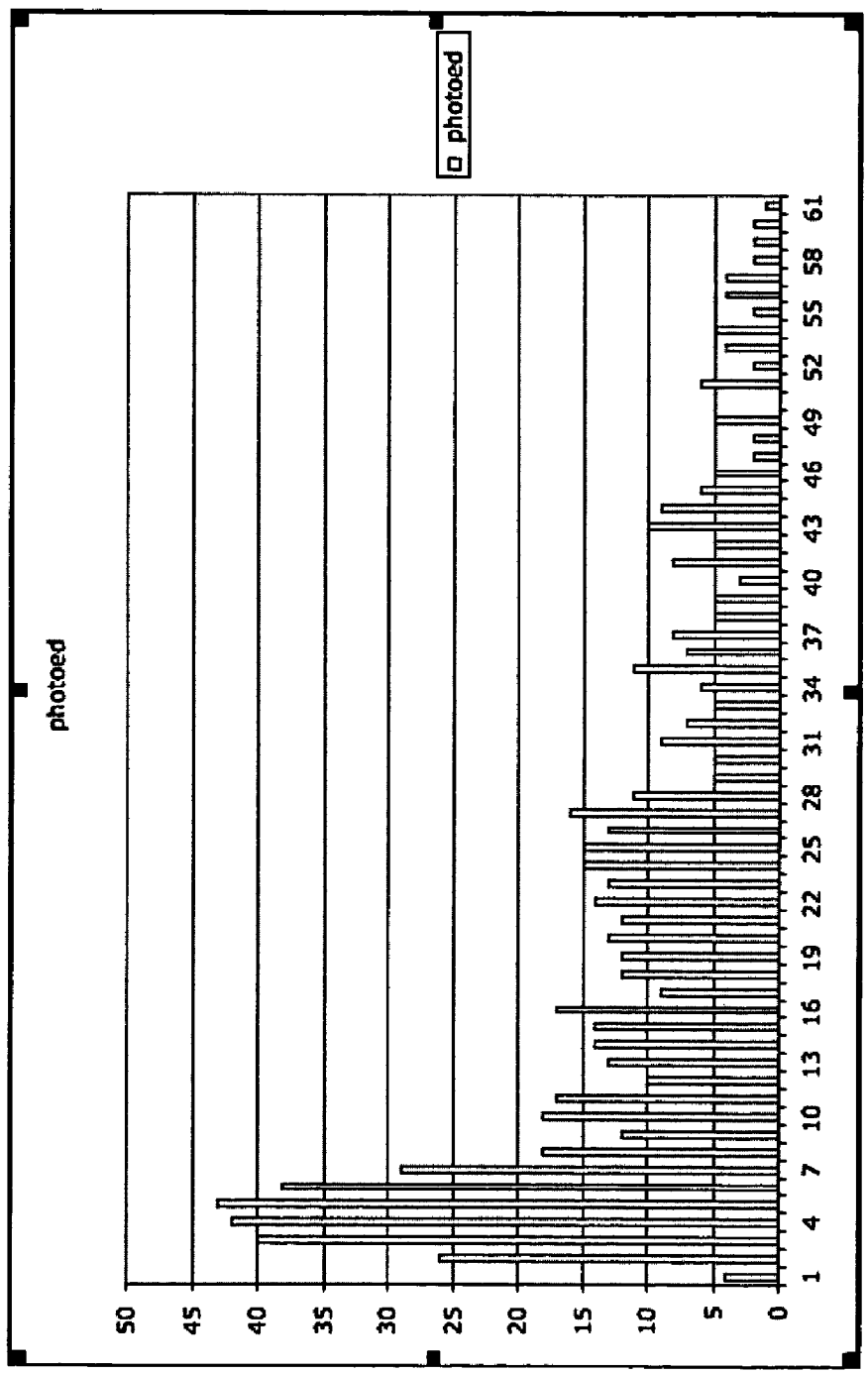
Figure 13:
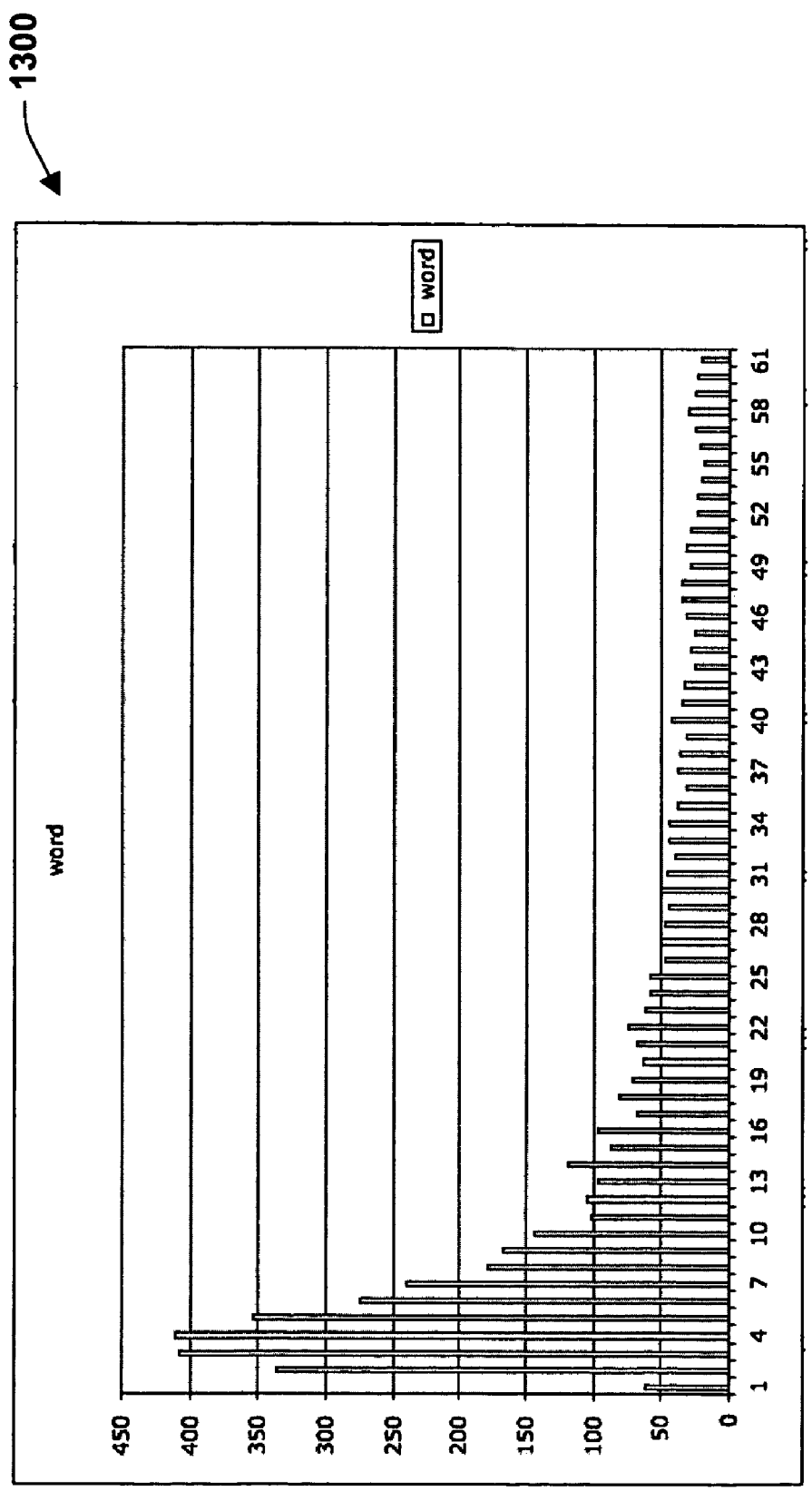
Figure 14:
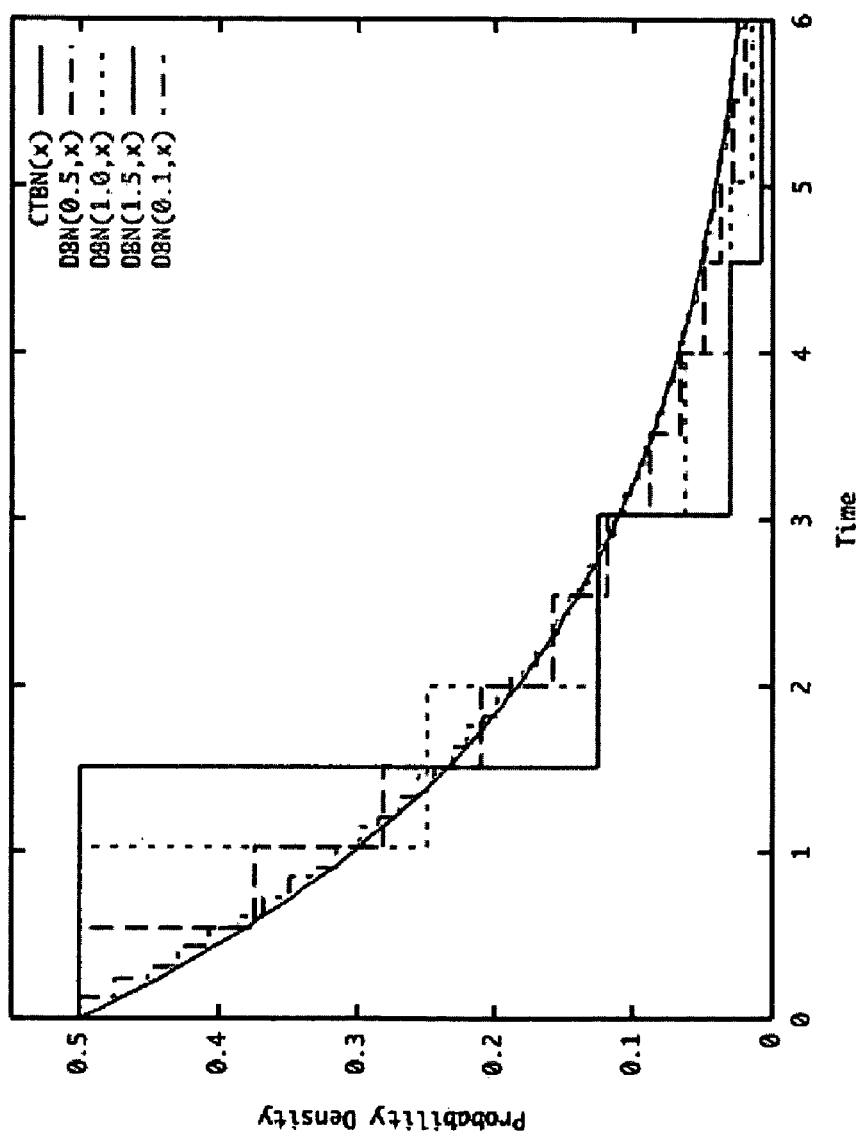

FIG. 9 depicts a graph 900 of Erlang distributions that form a useful subclass of phase distributions, wherein the graph 900 displays density functions for a few examples. One of the advantages of Erlang distributions are that they have relatively few parameters. In fact, if one has decided on a fixed number of phases, then there is only one parameter which determines the mean of the distribution. In general, a complex duration CTBN is formed by allowing each state of each variable to be represented by some number of substates. If value x of variable X is represented by 3 substates $x_1$, $x_2$, and $x_3$, then X has value x if and only if it is in any of these substates. Given the representation of the transitions between the substates written as an intensity matrix, the distribution can be written over when the variable leaves the state in closed form with a matrix exponential. Note, for the class of Erlang distributions, this can be simplified further.

FIGS. 10-13 illustrate experimental data in accordance with the present invention. A number of experiments were performed using expected loss to compare DBNs with different time granularities to regular CTBNs and Erlang-based CTBNs (For Erlang CTBNs 2 phase and 3 phase Erlangs were used). In general, the results showed that from best to worst, the models are: (1) Erlang-2 CTBNs, (2) DBNs, (3) Regular CTBNs, (4) Erlang-3 CTBNs. However, the results may have been misleading since expected loss was calculated from models that were learned with Bayesian scoring and Bayesian parameters. These parameters may not be the optimum for minimizing expected loss. In fact, increasing the amount of data used for learning may degrade performance. In order to investigate this, empirical distributions of durations in different applications were examined—leading to the following histograms in FIGS. 10-13. The x-axis is time in seconds and there are histograms for Internet Explorer, Outlook, PhotoEdit, and Word. In order to see the pattern more clearly, these histograms are cut off after 1 minute even though there are durations that exceed 1 minute.

There are at least two relevant features of the above distributions to observe. (1) The distributions are shaped more like Erlang distributions than exponential (or geometric) distributions. (2) The distributions have long tails such that the mean is much greater than the mode. With respect to (1), this may explain why Erlang-2 distributions did better than DBNs and regular CTBNs. (The Erlang-3 distributions are more peaked and thus more sensitive to the parameter chosen. The fact that they performed worse seems related to the fact that the parameters were not chosen to minimize expected loss.) With respect to (2), this may explain why DBNs (with geometric distributions) did better than regular CTBNs (with exponential distributions). Even though the geometric distribution can be seen as a discrete analog to an exponential distribution, there are some systematic differences. Namely, if the distributions have the same mean, the geometric puts more probability mass on transitions that occur before the mean and less on transitions that occur after the mean compared to the exponential distribution. This effect is more pronounced with larger time granularities. (As the time granularity approaches zero, the geometric distribution becomes a better and better approximation of the exponential distribution.) This can be observed from the graph 1400 in FIG. 14 that shows an exponential distribution and geometric distributions for different time granularities having a mean of 2.

Figure 15:
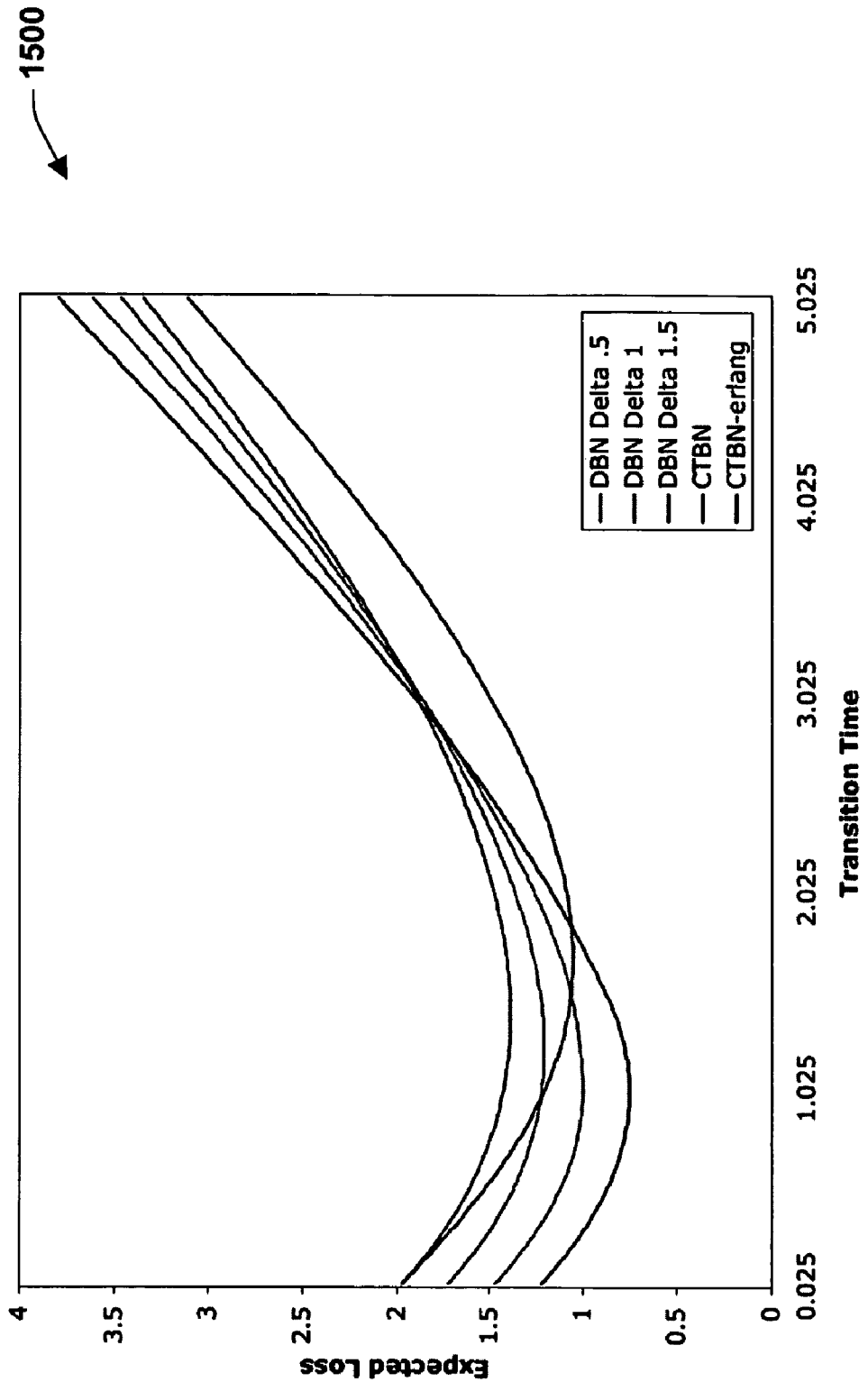

Given that the Bayesian parameters tend (with enough data) to match the mean of the empirical distribution, a situation occurs where more durations are smaller than the mean, it may be expected that the DBN may perform better because of its bias towards shorter durations. This explanation is supported by the observation that DBNs with larger time granularities tended to perform better in the experiments than DBNs with smaller time granularities. In general, it is expected that as the time granularity approaches zero, the performance of the DBN would match the CTBN. This can be shown more clearly with the graph 1500 in FIG. 15 showing expected loss versus transition time for CTBNs and DBNs of different time granularities. The mean transition time for all distributions is 2. Note that if the actual transition time is less than the mean, the expected loss is smallest for the DBN with the largest time granularity.

Figure 16:
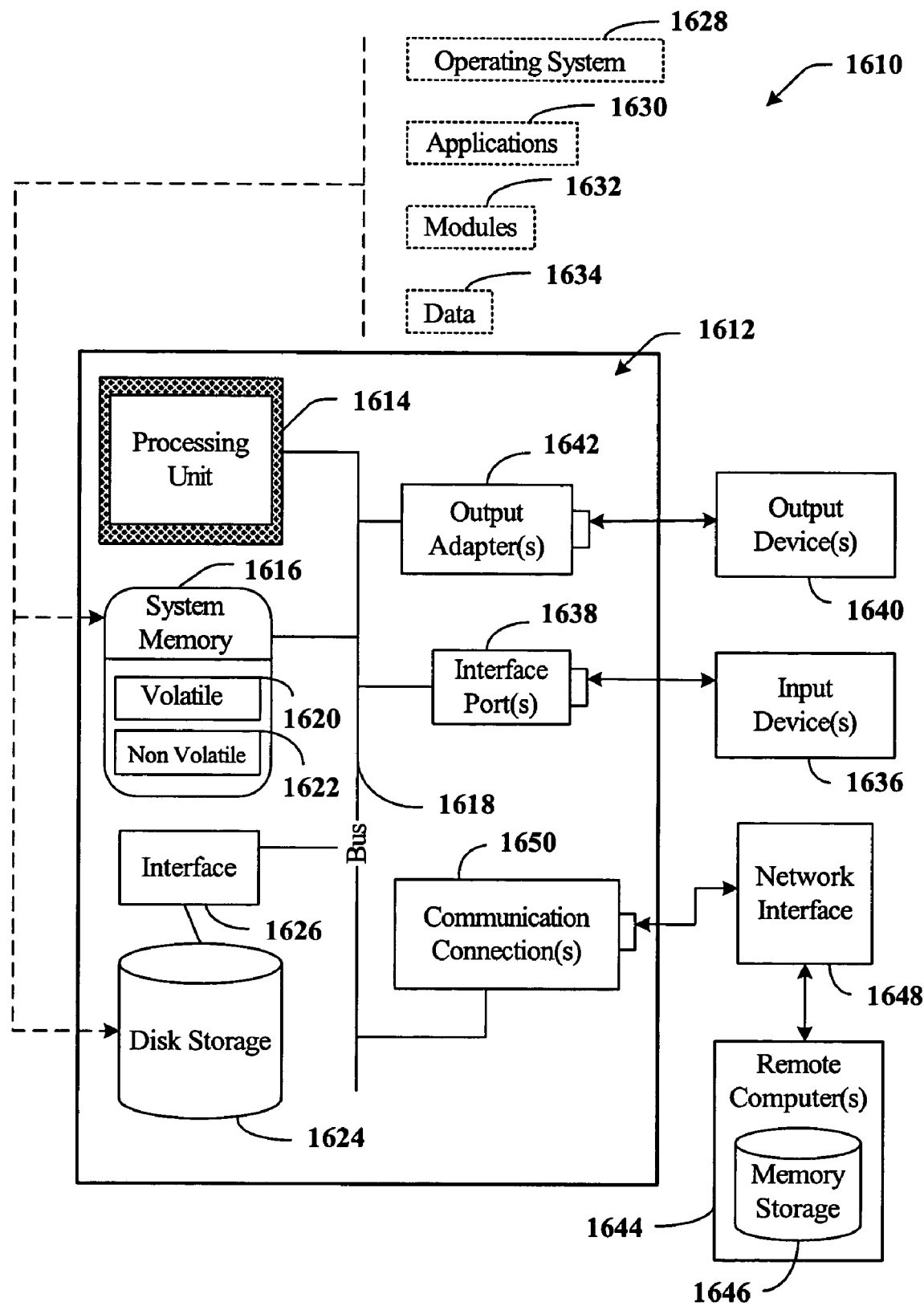
FIG. 16 is a schematic block diagram illustrating a suitable operating environment in accordance with an aspect of the present invention.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example a disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the present invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612, and to output information from computer 1612 to an output device 1640. Output adapter 1642 is provided to illustrate that there are some output devices 1640 like monitors, speakers, and printers, among other output devices 1640, that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems and DSL modems, ISDN adapters, and Ethernet cards.

Figure 17:
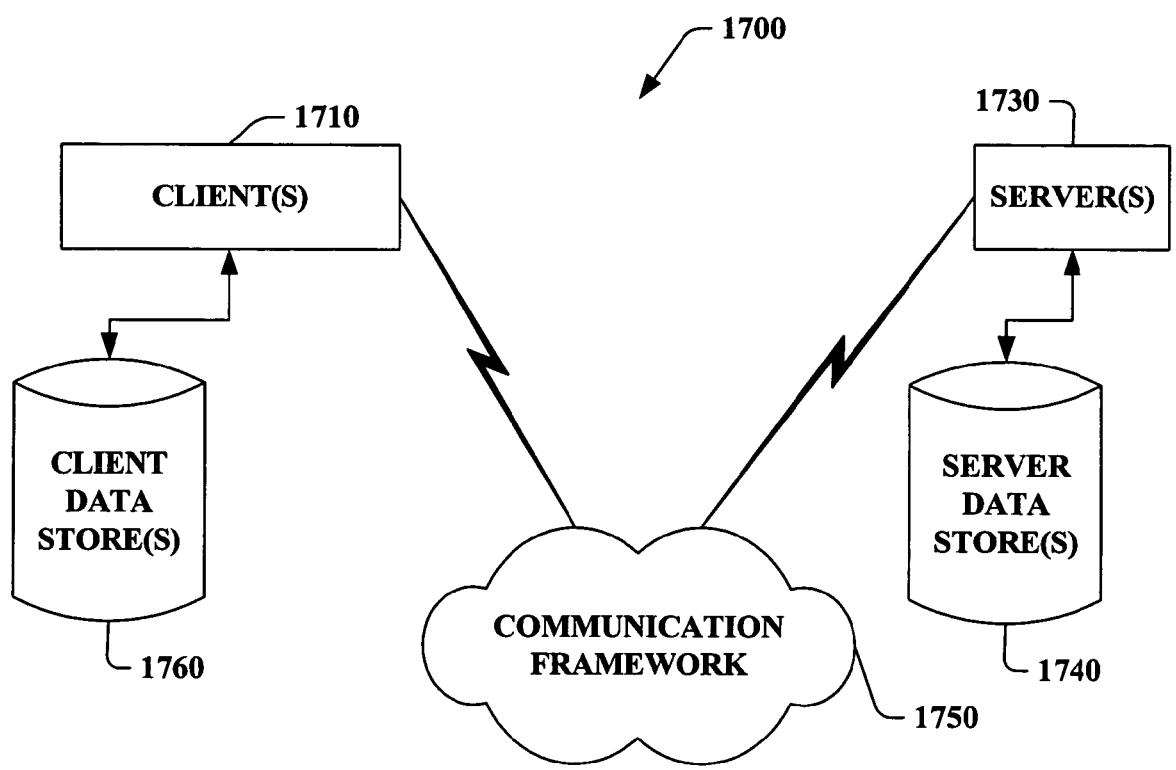
FIG. 17 is a schematic block diagram of a sample-computing environment with which the present invention can interact.

FIG. 17 is a schematic block diagram of a sample-computing environment 1700 with which the present invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The servers 1730 can house threads to perform transformations by employing the present invention, for example. One possible communication between a client 1710 and a server 1730 may be in the form of a data packet adapted to be transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A prediction system to facilitate communications and collaboration between entities, comprising:
    a presence component to determine a user's state at a computer; and
    an application component associated with the presence component that forms a model to generate predictions relating to states of the user and at least one application, the model adapted in accordance with a continuous time Bayesian network.

2. The system of claim 1, wherein the model predicts the user's activities and component usage.

3. The system of claim 1, wherein the model predicts an application that is currently on top or at the focus of the user's attention.

4. The system of claim 1, wherein the model determines when the user is expected to be present on a computer.

5. The system of claim 1, wherein the model determines when the user is expected to access the application.

6. The system of claim 5, wherein the application includes at least one of an email application, a calendar application, a text application, a presentation application, a graphics application, a software development application, an audio application, a video application, a spreadsheet application, an Internet application, and a communications application.

7. The system of claim 1, wherein the model determines how much time the user is expected to remain on a computer.

8. The system of claim 1, wherein the model determines how much time before the user is expected to change to a different application.

9. The system of claim 1, further comprising a calendar component that indicates at least one of a weekday or a weekend.

10. The system of claim 1, further comprising a discretized variable that keeps track of how long it has been since the user last used the application.

11. The system of claim 1, further comprising a forecasting component that receives one or more queries regarding an identified user's presence or availability and generates one or more predictions relating to current or future states of the identified user.

12. The system of claim 11, wherein the forecasting component determines complementary information relating to how long a person is expected to be absent, or how long a person may be unavailable.

13. The system of claim 11, wherein the forecasting component determines presence states that include at least one of a time until a user will arrive at or leave a location, a time until the user will be at a location for at least time t, a time until the user will have access to a device, a time until the user will review an e-mail or other message, a time until the user will finish a conversation in progress, a likelihood the user will attend a meeting, and an expected cost of interruption over time.

14. The system of claim 11, wherein the forecasting component is implemented as at least one of a server, a server farm, a client application, a web service, and an automated application that provides answers to automated systems or authorized people.

15. The system of claim 11, further comprising an event database that logs periods of presence and absence as events in an event log.

16. The system of claim 15, wherein the events are annotated by source devices that are defined by respective capabilities and locations.

17. The system of claim 16, further comprising tagging of events by specific devices, indexed by capabilities to enable a system to forecast a probability distribution over a time until the user will have access to different types of devices.

18. The system of claim 11, wherein the forecasting component predicts a time when a current conversation is likely to end.

19. A computer readable medium having computer readable instructions stored thereon for implementing the components of claim 1.

20. A method to provide presence forecasts, comprising:
determining a presence model to predict a user's presence or absence from a computer; and
determining an application model to facilitate determining the use's presence or absence from the computer, at least one of the presence model and the application model configured according to a continuous time Bayesian network.

21. The method of claim 20, further comprising determining a total loss for a trajectory.

22. The method of claim 20, further comprising determining a local loss as a measure of how well a particular transition is predicted by a model.

23. The method of claim 20, further comprising determining a loss function as zero at a point of transition and nonnegative for left and right portions of the transition.

24. The method of claim 23, further comprising determining a basic shape of the loss function having independent parameters for the left and right portions of the loss function.

25. The method of claim 24, the loss function is a linear function having the form:

$$\text{lin}<\text{alpha, beta, } t'>(t)=\text{alpha}(t'-t) \text{ for } t<t' \text{beta}(t-t') \text{ otherwise}$$

where t' is an actual time of transition, t is a predicted time of transition, and parameters alpha and beta are slopes for linear portions of the loss function.

26. The method of claim 25, further comprising determining an expected loss as an expected value of the loss function given a distribution over when a transition will take place.

27. The method of claim 26, wherein the expected loss is computed as a function of a relevant intensity parameter q and an actual time of transition t.

28. The method of claim 27, wherein the expected loss is computed according to the following formula:
CTBNExpectedLoss($q,t$)=(alpha+beta)/$q$ * exp($-qt$)+alpha($t-1/q$), wherein expected loss is computed along a z-axis as a function of $q$ (y-axis, from 0 to about 2) and $t$ (x-axis from 0 to about 10).

29. The method of claim 20, further comprising determining a phase distribution as a distribution over a time to absorption to an absorbing state of a continuous time Markov process.

30. A system to facilitate communications and collaboration between entities, comprising:
means for learning activity patterns from one or more user events;
means for generating predictions relating to future user states; and
means for predicting the future user states based upon an application a user currently is working on and the events, the future user states modeled in accordance with a continuous time Bayesian network.

31. A prediction system to facilitate operating systems management, comprising:
a processing component to determine a state of a computer; and
a model associated with the processing component that generates predictions relating to resource requirements of the computer, the model adapted in accordance with a continuous time Bayesian network.

32. The system of claim 31, the model determines allocation of resources in an operating system running on the computer, based on expectations under uncertainty on when different resources and information are needed by at least one component.

33. The system of claim 31, the model is employed to move components in memory, delete data from memory, close unused applications, adjust operating system performance, perform automated maintenance, perform cache management, adjust pre-fetching operations, adjust interrupt processing, initiate dynamic performance optimization or perform speculative computing operations.

* * * * *